United States Patent
Weiss et al.

(10) Patent No.: US 11,807,404 B2
(45) Date of Patent: Nov. 7, 2023

(54) ABORT-SAFE VEHICLE RENDEZVOUS IN CASE OF PARTIAL CONTROL FAILURE

(71) Applicant: Mitsubishi Electric Research Laboratories, Inc., Cambridge, MA (US)

(72) Inventors: Avishai Weiss, Cambridge, MA (US); Stefano Di Cairano, Newton, MA (US); Daniel Aguilar Marsillach, Boulder, CO (US); Uros Kalabic, Jamaica Plain, MA (US)

(73) Assignee: MITSUBISHI ELECTRIC RESEARCH LABORATORIES INC., Cambridge, MA (US)

( * ) Notice: Subject to any disclaimer, the term of this patent is extended or adjusted under 35 U.S.C. 154(b) by 481 days.

(21) Appl. No.: 16/914,386

(22) Filed: Jun. 28, 2020

(65) Prior Publication Data

US 2021/0403183 A1    Dec. 30, 2021

(51) Int. Cl.
*B64G 1/00*    (2006.01)
*B64G 1/64*    (2006.01)
*B64G 1/24*    (2006.01)

(52) U.S. Cl.
CPC .............. *B64G 1/646* (2013.01); *B64G 1/242* (2013.01)

(58) Field of Classification Search
CPC ................................ B64G 1/646; B64G 1/242
See application file for complete search history.

(56) References Cited

U.S. PATENT DOCUMENTS

| 10,882,644 B1 * | 1/2021 | Schwarz | B64G 1/36 |
| 11,377,237 B1 * | 7/2022 | Monda | B64G 1/646 |
| 2009/0132105 A1 * | 5/2009 | Paluszek | B64G 1/26 |
| | | | 701/13 |

(Continued)

OTHER PUBLICATIONS

Dueri, D et al. Finite-Horizon Controllability and Reachability for Deterministic and Stochastic Linear Control Systems with Convex Constraints. 2014 American Control Conference, pp. 5016-5023 [online],[retrieved on Jul. 28, 2022]. [Retrieved from Internet at https://ieeexplore.ieee.org/document/6859302] (Year: 2014).*

(Continued)

*Primary Examiner* — Peter D Nolan
*Assistant Examiner* — Peter Y Ning
(74) *Attorney, Agent, or Firm* — Gennadiy Vinokur; Hironori Tsukamoto; LABORATORIES

(57) ABSTRACT

Systems and methods controlling an operation of a vehicle in real time to rendezvous the vehicle with a target over a finite time horizon having multiple specified time periods. Select a set of unsafe regions from stored unsafe regions, the set of unsafe regions represents regions of space around the target in which any operation of the PSNO thrusters does not avoid collision with the target, guaranteeing collision trajectories with the target. Formulating the set of unsafe regions as safety constraints, and updating a controller having a model of dynamics of the vehicle with the accepted data. Generating control commands by subjecting the updated controller to the safety constraints to produce a rendezvous trajectory that avoids the set of unsafe regions, guaranteeing an operation of at least the PSNO thrusters, in the event of partial vehicle thruster failure results in a trajectory that does not collide with the target.

28 Claims, 20 Drawing Sheets

(56) References Cited

U.S. PATENT DOCUMENTS

| | | | | |
|---|---|---|---|---|
| 2013/0126678 | A1* | 5/2013 | Romney, Jr. | B64G 1/26 |
| | | | | 244/172.4 |
| 2018/0118377 | A1* | 5/2018 | Garber | B64G 1/242 |
| 2020/0354089 | A1* | 11/2020 | Yakimenko | B64G 1/36 |
| 2021/0292011 | A1* | 9/2021 | Limotta | G06N 3/084 |

OTHER PUBLICATIONS

Starek, J et al. Fast, Safe, and Propellant-Efficient Spacecraft Planning under Clohessy-Wiltshire-Hill Dynamics. arXiv: 1601.00042v1 [cs.SY] Jan. 1, 2016 [online], [retrieved on Jul. 28, 2022]. Retrieved from the Internet <URL: https://arxiv.org/pdf/1601.00042.pdf> (Year: 2016).*

"Fast, Safe, and Propellant-Efficient Spacecraft Planning under Clohessy-Wiltshire-Hill Dynamics", Joseph A Starek et al., XP080960086.

"Chance-Constrained Model Predictive Control for Spacecraft Rendezvous with Disturbance Estimation", Francisco Gavilan et al., XP028393100.

"Constant Thrust Collision Avoidance Maneuver under Thruster Failure", Yongqiang Qi et al., XP028433856.

"NASA Launches Dart Spacecraft to Demonstrate Automated Rendezvous Cabability." Newton, Kim. https://nasa.gov/mission_pages/dart/media/05-049.html. Apr. 15, 2005.

* cited by examiner

Algorithm 1 Safe Rendezvous Control

Offline: Compute the unsafe set (20)

1: input: $x(t)$
2: repeat
3:     Select $\ell$ polyhedra of $\bar{\mathcal{R}}_N^{\text{rdv}}(\mathcal{S}_f)$ closest to $x_{k|t}$ by (23) for $k = 1, \ldots, N$
4:     Construct (18c) by (22) for $k = 1, \ldots, N_p$
5:     Solve optimal control problem (18)
6:     Apply control policy (19) to the deputy spacecraft
7: until Final approach is activated

FIG. 5

*Starting Position at different locations outside the unsafe region (RBRSI), failure happens at the start, the trajectories are safe and do not collide with the target

*Starting Position at different locations inside the unsafe region (RBRSI), failure happens at the start, the trajectories lead to collision with the target $i$ = Inclination
$\omega$ = Argument of Periapsis
$\Omega$ = Longitude of Ascending Node
$N_1$ = Ascending Node
$N_2$ = Descending Node

ABORT-SAFE VEHICLE RENDEZVOUS IN CASE OF PARTIAL CONTROL FAILURE

FIELD

The present disclosure relates generally to controlling an operation of a chaser spacecraft, and more particularly to abort-safe control policy for chaser spacecraft rendezvous on elliptic orbits using robust backwards reachable sets and model predictive control (MPC) in case of partial thrust failure.

BACKGROUND

Spacecraft redezvous is a set of orbital maneuvers performed during which two spacecraft, i.e. chaser spacecraft and a target or space station, arrive at the same orbit and approach to a very close distance (e.g. within visual contact). Rendezvous requires a precise match of the orbital velocities and position vectors of the two spacecraft, allowing them to remain at a constant distance through orbital station-keeping. Rendezvous may or may not be followed by docking or berthing, procedures which bring the spacecraft into physical contact and create a link between them. Further, the same rendezvous technique can be used for spacecraft "landing" on natural objects if there is a weak gravitational field, e.g. landing on an asteroid or on one of the Martian moons would require the same matching of orbital velocities, followed by a "descent" that shares some similarities with docking.

However, safe rendezvous to targets presents several challenges for chaser spacecraft. A critical criteria for rendezvous is the maintenance of safety, that is, an ability to avoid a collision between a chaser spacecraft and its target, in the event of partial thruster failure. For example, achieving safe rendezvous for the chaser spacecraft is difficult, as learned from the Demonstration of Autonomous Rendezvous Technology (DART) mission launched Apr. 15, 2005. The DART mission was set out on a 24-hour mission to meet and fly around an aging military communications satellite dubbed Mublcom. The mission ended less than 11 hours later after DART collided with Mublcom, instead of performing a series of precise maneuvers around the small spacecraft. After a 4.5-month, $1 million investigation into the mishap, Scott Croomes, the NASA engineer who chaired the DART Mishap Investigation Board, said the mission's failure stemmed from a combination of spacecraft navigation errors traced back to missteps by the vehicle's Orbital Sciences Corp., led design team. Croomes also said the DART's GPS receiver misstated DART's velocity, and the software designers had not adequately accounted for any such receiver bias. Where, in the designing of the software model, the team used to simulate the receiver during testing which assumed the receiver measured velocity perfectly. Nevertheless, the NASA spokeswoman Kim Newton, at the time, said the agency's investment in autonomous rendezvous and docking technology needed to continue, and be more advanced.

Further, the National Research Council recognizes that autonomous relative guidance, navigation, and control algorithms are some of the highest-priority technologies for future spacecraft missions. Such techniques play a fundamental role in acquiring valuable scientific data and in the exploration of the solar system. For increasingly complex and autonomous missions, there is a need to develop more robust, reliable, and, importantly, abort-safe relative guidance, navigation, and control algorithms.

Abort-safe rendezvous for a chaser spacecraft to target is the scenario of partial loss of control, in which the chaser's remaining functional thrusters may be engaged to safely avoid collision. Classically, when a chaser spacecraft deviates significantly from its nominal approach in proximity to the target and its current trajectory is not passively safe, a predetermined active collision avoidance maneuver (CAM) must be engaged. However, depending on approach trajectory and extent of partial thruster failure, a CAM may not always be possible.

Therefore, a need exists in the art for an improved way to control an operation of a chaser spacecraft, for safe rendezvous that includes method approaches preventing the chaser spacecraft from colliding with the target in the event of a partial loss of thruster control, among other aspects.

SUMMARY

The present disclosure relates to an abort-safe control policy for spacecraft rendezvous on orbits including elliptic orbits, using robust backwards reachable sets and model predictive control (MPC) in case of partial thrust failure.

The robust backwards reachable sets are computed as unsafe regions of state space around the target guaranteeing collision trajectories with the target no matter the remaining available thrust, in an event of partial chaser spacecraft thruster failure within a specified time-period. The robust backwards reachable sets are incorporated or formulated as safety constraints in the MPC online trajectory generation, in order to guide the chaser spacecraft to rendezvous with the target through an inherently safe approach.

Some embodiments of the present disclosure include controlling an operation of a vehicle in real time to rendezvous the vehicle with a target over a finite time horizon. Wherein the target can be one of a spacecraft, a celestial body or orbital debris. The finite time horizon of the chaser spacecraft begins at a starting position and continues with multiple specified time periods, and ends when the chaser spacecraft arrives at the target location. Current data is accepted in real time and can include values of vehicle states and target states in a multi-object celestial system, and a predetermined subset of a number of operational thrusters that is less than a total number of operational thrusters of the vehicle, at a specified time period of multiple specified time periods within the finite time horizon. The predetermined subset of the number of operational thrusters can be provided by a user or an operator. The chaser spacecraft states and the target states in the multi-object celestial system can include one or combination of positions, orientations, and translational and angular velocities of the chaser spacecraft and the target, and perturbations acting on the multi-object celestial system, wherein the chaser spacecraft and the target form the multi-object celestial system. For example, the perturbations acting on the multi-object celestial system can be natural orbital forces such as solar and lunar gravitational perturbations, anisotropic gravitational perturbations due to a central body's non-sphericity, solar radiation pressure, and air drag.

Using a processor at the specified time period, the processor is configured to identify a target orbit location from the accepted data in real time. For example, the target orbit location can be determined based on uploaded ephemeris from a ground station, based on ground data obtained in satellite tracking databases, or estimated from onboard sensor measurements on the vehicle obtained from the accepted data. Upon determining the target orbit location, the processor accesses unsafe regions from a memory, and uses the target orbit location and the predetermined subset of the number of operational thrusters of the vehicle at the specified time period, to identify a set of unsafe regions from the stored unsafe regions. Wherein the set of unsafe regions represents regions of space around the target in which any operation of the predetermined subset of the number of operational thrusters does not avoid collision with the target, guaranteeing collision trajectories with the target.

The processor can then convert or formulate the set of unsafe regions into safety constraints and send the safety constraints to the controller. Depending on a user specific controller design configuration(s), the controller can include a control module, wherein the controller or control module can be configured to process such converting or formulating steps to obtain the safety constraints. The controller can include a model of dynamics of the vehicle, such that the controller is updated with the accepted data.

Upon updating the controller, the updated controller is subject to the safety constraints to generate control commands to produce a rendezvous trajectory that avoids the set of unsafe regions, guaranteeing an operation of at least the predetermined subset of the number of operational thrusters, that, in the event of partial vehicle thruster failure, results in a trajectory that does not collide with the target. Wherein the control commands can be outputted to activate or not activate one or more thrusters of the vehicle for the specified time period based on the control commands.

The control commands may be outputted to an operations module of the controller, such that the operations module can communicate the control commands to a thruster command module that receives the control commands as delta v commands. The thruster command module can then convert the delta v commands to thruster commands, and send the thruster commands to a thruster processor of at least one thruster, to activate or not activate the at least one thruster for trajectory-tracking control of the vehicle, according to the converted delta v commands.

However, in order to develop some of the embodiments of the present disclosure there were assumptions and realizations that assisted in their development. Some assumptions made in terms of a spacecraft model, included the target and the chaser spacecraft configured to be in orbit around a central body, i.e. Earth. Further assumed is that both the target and chaser spacecraft's bodies to be rigid and all external forces acting on the chaser spacecraft are assumed to act on a center of mass of their respective bodies. For the purposes of rendezvous, some calculations had to be resolved relative to positions and velocities of the chaser in the target's orbital frame, which is later explained in detail.

At least one realization of the present disclosure included combining concepts from reachability and model predictive control (MPC), to design an online trajectory generation algorithm that produces safe rendezvous trajectories for the chaser spacecraft to its target on generic elliptic orbits. Reachability studies the problem of determining the subset of the state space which can be steered via an admissible control sequence to any given target set, while guaranteeing that the state constraints will be satisfied for all allowable disturbance sequences. By using backwards reachability, starting at the target, we can determine the set of states that lead to the target. In this case, for a given thrust failure scenario, or partial thruster failure, the set of states that would lead to collision no matter the remaining available thrust are unsafe, that is, any operation of the predetermined subset of the number of operational thrusters does not avoid collision with the target. It is a realization that unlike in most experimental applications of reachability tested that dictate a spacecraft must remain inside reachable sets, for the aspects of the present disclosure, the reachable sets are used to characterize unsafe sets in state space which a chaser spacecraft must avoid. Therefore, it is a realization that by using MPC to avoid this unsafe region, computed using robust backwards reachability, we can generate safe trajectories that, in the event of a partial control failure, abort maneuvers exist and the chaser spacecraft thrusters can be operated in a manner in which the chaser spacecraft never collides with the target.

Model predictive control (MPC) is based on an iterative, finite horizon optimization of a model of a spacecraft, a set of objectives of the motion of the spacecraft, and constraints on the spacecraft propulsion system and motion, and has the ability to anticipate future events to take appropriate control actions. This is achieved by optimizing the operation of the spacecraft according the set of objectives, over a future finite time-horizon with prediction obtained according to the model of the spacecraft subject to constraints, and only implementing the control over the current timeslot. For example, the constraints can represent physical limitation of the spacecraft, safety limitations on the operation of the spacecraft, and performance limitations on a trajectory of the spacecraft. A control strategy for the spacecraft is admissible when the motion generated by the spacecraft for such a control strategy satisfies all the constraints. For example, at time t, the current state of the spacecraft is sampled and an admissible cost minimizing control strategy is determined for a relatively short time horizon in the future. Specifically, an online or real-time calculation determines a cost-minimizing control strategy until time t+T. After the step of the control is implemented, the state is sampled again and the calculations are repeated starting from the now current state, yielding a new control and new predicted state path. The prediction horizon shifts forward, and for this reason MPC is also called receding horizon control. It is a realization that by formulating constraints in the MPC to control the spacecraft in a manner that avoids the unsafe region calculated using robust backwards reachability, we can guarantee that in the event of a partial loss of control abort maneuvers exist and the chaser spacecraft thrusters can be operated in a manner in which the chaser spacecraft never collides with the target.

It is possible to use MPC alone in a brute-force approach to produce safe rendezvous trajectories for the chaser spacecraft to its target on generic elliptic orbits, as tested in experimentation. However, in order to do so, one needs to formulate a very large number of safety constraints that creates a very large optimization problem, and results in a very high computational burden which may not be able to be implemented in the computational resource constrained hardware in spacecraft. Furthermore, this experimental MPC would only produce a single safe rendezvous trajectory for the current assumed state of the chaser spacecraft. If there was any error or uncertainty with regard to the current state of the spacecraft, the safety constraints formulated in the MPC would not actually ensure safe operation of the spacecraft in the event of partial thruster failure for the true state. It is a realization that by combining the concepts of reachability and MPC we are able to offload the safety computations from the MPC into a separate offline (or online) computation of the unsafe regions to avoid, thereby both reducing the computational burden of and speeding up the solving of the optimization problem in the MPC, while additionally adding robustness to the method in order to categorize wide regions of safe and unsafe state space so that the MPC would guarantee safe operation (collision free rendezvous trajectories) for a large range of chaser spacecraft states.

Another realization realized for achieving abort safety, is that we can use robust backwards reachable sets over a time interval (RBRSI) from the target that, in the event of partial loss of control, characterize the unsafe state-space that would lead to collision no matter the remaining available thrust. Thrust failure scenarios, i.e. predetermined subsets of a number of operational thrusters, are encoded in admissible control sets and are treated as if the control was a disturbance, that is, the RBRSI are computed for all possible controls in the admissible set. Thus, the RBRSI determine the regions of state-space for which all possible control sequences end up at the target, i.e., no feasible evasive abort maneuvers exist. Abort safety is a guarantee that during rendezvous, if there is partial loss of control, safe abort maneuvers exist and thus a chaser spacecraft can avoid a collision with the target.

In order for computational tractability, another realization was that the nonlinear relative equations of motion about the target's generic orbit needed to be linearized, resulting in a set of linear time-varying (LTV) equations. Such that, due to the LTV nature of the system, an exact computation of the RBRSI is impossible. Hence, an approximation of the unsafe region can be made with an offline computation of a union of RBRSI along the target's entire orbit. The union of RBRSI determines the region to be avoided, which is formulated as safety constraints for the online trajectory generation process.

Another realization included was using the model predictive control (MPC) policy for enforcing the safety constraints, so as to ensure that the chaser spacecraft remains outside of the union of RBRSI, and results in guaranteeing collision free trajectories in the event of thruster failure. The MPC policy can be referred to as an abort-safe MPC policy, an abort-safe control policy, safe controller, throughout the disclosure.

The MPC policy is based on solving a receding horizon optimal control problem. For example, the MPC policy only enforces constraints that ensure safety. Additional constraints, e.g., on the control inputs, can also be included. The constraints enforcing LTV RBRSI avoidance are non-convex, since they require avoiding a union of convex sets such as ellipsoids, polytopes, or zonotopes. This significantly complicates the finite-horizon MPC optimal control problem. In fact, even an avoidance of each convex set is described by non-convex constraints. Thus, in order to address this problem a local convexification approach is implemented, we convexify by computing a half-space that covers a local region of unsafe sets, which we use as a safety constraint for the online trajectory generation process. By enforcing these half-space constraints, we ensure that safety can be achieved by remaining in the safe set and outside the unsafe set. Half-space constraints are constraints that constrain a state to be on one side of a hyperplane, therefore in the present disclosure we often use hyperplane constraints and half-space constraints interchangeably. In one embodiment of the present disclosure, the hyperplanes are computed by solving an optimization problem (linear program if the unsafe sets are constructed with polytopes) that finds a hyperplane that separates the chaser spacecraft state from the unsafe sets.

In one embodiment of the present disclosure, the half space constraints are formulated as a chance constraints which requires that the half space constraint be satisfied with at least a priori specified probability level due to an uncertainty regarding a position of the vehicle or the target, and/or an uncertainty of a thruster magnitude or a direction. In effect, the half space constraints are "tightened" based on a priori specified probability level and the covariance of the uncertainty so that they move away from the unsafe region boundary, giving a buffer region to account for the possibility that the expected chaser spacecraft state may in actuality be closer to the unsafe region than estimated, thus guaranteeing that the chaser will remain outside the unsafe region to the a priori specified probability level.

Some embodiments of the present disclosure include an approach that is applied to a mission which is staged into three phases. A first phase constrains the controller to maintain safety with respect to an approach polytope (AP) around the target. A second phase is initiated once the command to enter the AP is issued, maintains safety with respect to a keep-out polytope (KOP). Finally, a third phase is initiated once the final approach is engaged, wherein the chaser spacecraft may enter the KOP, and maintains safety with respect to an over-approximation of the target's physical geometry. According to one non-limiting embodiment, the controlled chaser spacecraft is actuated by eight thrusters, each mounted in a manner aligned with the center of mass of the spacecraft so that they produce forces to change the position of the spacecraft while producing no torques to rotate the spacecraft.

According to an embodiment of the present disclosure, a system for controlling an operation of a vehicle in real time to rendezvous the vehicle with a target over a finite time horizon. A transceiver that accepts data in real time including values of vehicle states and target states in a multi-object celestial system, and a predetermined subset of a number of operational thrusters that is less than a total number of operational thrusters of the vehicle, at a specified time period within the finite time horizon. The system including a processor at the specified time period that is to identify a target orbit location from the accepted data in real time. Access a memory having unsafe regions, to select a set of unsafe regions corresponding to the target orbit location and the predetermined subset of the number of operational thrusters of the vehicle. Wherein the set of unsafe regions represents regions of space around the target in which any operation of the predetermined subset of the number of operational thrusters does not avoid collision with the target, guaranteeing collision trajectories with the target. Formulate the set of unsafe regions as safety constraints, and update a controller having a model of dynamics of the vehicle with the accepted data. Generate control commands by subjecting the updated controller to the safety constraints to produce a rendezvous trajectory that avoids the set of unsafe regions, guaranteeing an operation of at least the predetermined subset of the number of operational thrusters, that, in the event of partial vehicle thruster failure, results in a trajectory that does not collide with the target. Output the control commands to activate or not activate one or more thrusters of the vehicle for the specified time period based on the control commands.

According to another embodiment of the present disclosure, a controller for controlling an operation of a vehicle in real time to rendezvous the vehicle with a target over a finite time horizon. A transceiver accepts data in real time including a target orbit location, and a predetermined subset of a number of operational thrusters less than a total number of operational thrusters of the vehicle. The system including a guidance and control computer (GCC) processor in a specified time period within the finite time horizon is to access a memory having unsafe regions. Select a set of unsafe regions corresponding to the target orbit location and the predetermined subset of the number of operational thrusters of the vehicle. Wherein the set of unsafe regions represents regions of space around the target in which any operation of the predetermined subset of the number of operational thrusters does not avoid collision with the target, guaranteeing collision trajectories with the target. Formulate the set of unsafe regions as safety constraints, and update a control module having a model of dynamics of the vehicle with the accepted data. Generate control commands by subjecting the updated control module to the safety constraints to produce a rendezvous trajectory that avoids the set of unsafe regions, guaranteeing an operation of at least the predetermined subset of the number of operational thrusters, in the event of partial vehicle thruster failure results in a trajectory that does not collide with the target. Output the control commands to activate or not activate one or more thrusters of the vehicle based on the control commands.

According to another embodiment of the present disclosure, a method for controlling an operation of a vehicle in real time to rendezvous the vehicle with a target over a finite time horizon having multiple specified time periods. Accepting data in real time including values of vehicle states and target states in a multi-object celestial system, and a predetermined subset of a number of operational thrusters that is less than a total number of operational thrusters of the vehicle, at a specified time period within the finite time horizon. The method including identifying a target orbit location from the accepted data in real time. Accessing a memory having unsafe regions, to select a set of unsafe regions corresponding to the target orbit location and the predetermined subset of the number of operational thrusters of the vehicle within the specified time period, and wherein the set of unsafe regions represents regions of space around the target in which any operation of the predetermined subset of the number of operational thrusters does not avoid collision with the target, guaranteeing collision trajectories with the target. Formulating the set of unsafe regions as safety constraints, and updating a controller having a model of dynamics of the vehicle with the accepted data. Generating control commands by subjecting the updated controller to the safety constraints to produce a rendezvous trajectory that avoids the set of unsafe regions, guaranteeing an operation of at least the predetermined subset of the number of operational thrusters, in the event of partial vehicle thruster failure results in a trajectory that does not collide with the target. Outputting the control commands to activate or not activate one or more thrusters of the vehicle for the specified time period based on the control commands.

According to another embodiment of the present disclosure, a non-transitory machine-readable medium including instructions stored thereon which, when executed by processing circuitry, configure the processing circuitry in real time to perform operations to control a spacecraft to rendezvous the spacecraft with a target over a finite time horizon. The spacecraft and the target form a multi-object celestial system. Accepting data in real time including values of spacecraft states and target states in a multi-object celestial system, and a predetermined subset of a number of operational thrusters that is less than a total number of operational thrusters of the spacecraft, at a specified time period within the finite time horizon. The non-transitory machine-readable medium including identifying a target orbit location from the accepted data in real time. Accessing a memory having unsafe regions, to select a set of unsafe regions corresponding to the target orbit location and the predetermined subset of the number of operational thrusters of the spacecraft within the specified time period. Wherein the set of unsafe regions represents regions of space around the target in which any operation of the predetermined subset of the number of operational thrusters does not avoid collision with the target, guaranteeing collision trajectories with the target. Formulating the set of unsafe regions as safety constraints, and updating a controller having a model of dynamics of the spacecraft with the accepted data. Generating control commands by subjecting the updated controller to the safety constraints to produce a rendezvous trajectory that avoids the set of unsafe regions, guaranteeing an operation of at least the predetermined subset of the number of operational thrusters, in the event of partial spacecraft thruster failure results in a trajectory that does not collide with the target. Outputting the control commands to activate or not activate one or more thrusters of the spacecraft for the specified time period based on the control commands.

According to another embodiment of the present disclosure, a controller for controlling an operation of a vehicle in real time to rendezvous the vehicle with a target over a finite time horizon having multiple specified time periods. Wherein the vehicle and the target form a multi-object coordination system. A transceiver accepts data in real time including values of vehicle states and target states in the multi-object coordination system, and a predetermined subset of a number of operational motors that is less than a total number of operational motors of the vehicle, at a specified time period within the finite time horizon. The controller including a guidance and control computer (GCC) processor having an interface to pass information in real time related to a propulsion control system of the vehicle. The GCC processor at the specified time period is configured to identify an area the target is located in real time from the accepted data. Access a memory having unsafe regions, to select a set of unsafe regions corresponding to the target area location and the predetermined subset of the number of operational motors of the vehicle. Wherein the set of unsafe regions represents regions within the area around the target in which any operation of the predetermined subset of the number of operational motors does not avoid collision with the target, guaranteeing collision trajectories with the target. Formulate the set of unsafe regions as safety constraints, and update a controller having a model of dynamics of the vehicle with the accepted data. Generate control commands by subjecting the updated controller to the safety constraints to produce a rendezvous trajectory that avoids the set of unsafe regions, guaranteeing an operation of at least the predetermined subset of the number of operational motors, in the event of partial propulsion control failure results in a trajectory that does not collide with the target. Output the control commands to the propulsion control system to activate or not activate one or more motors of the vehicle for the specified time period based on the control commands.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 5 is illustrating an algorithm associated with safe rendezvous control, where the unsafe set (20) is computed offline, since the algorithm is computationally demanding and does not require real-time data, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1A:
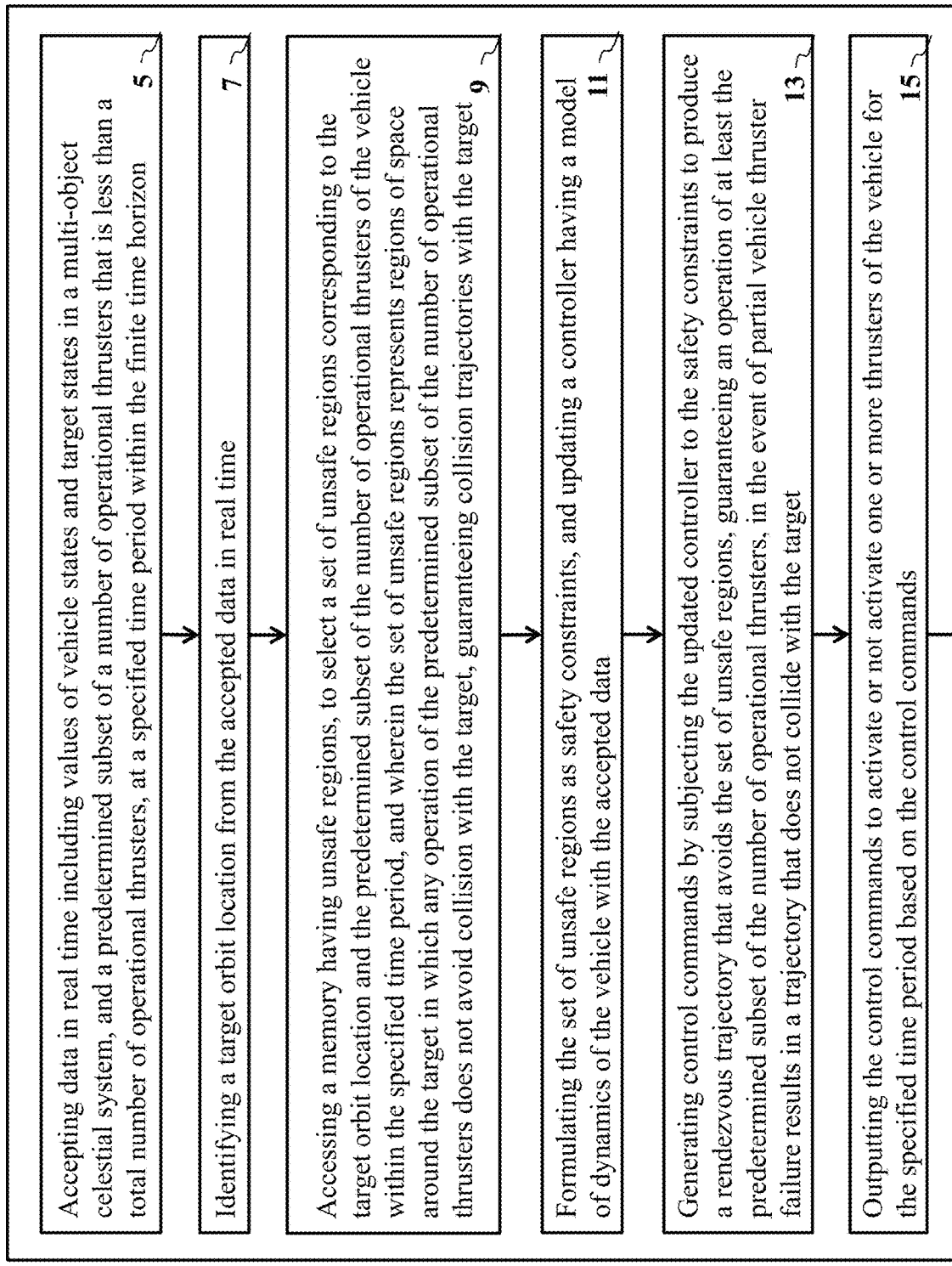
FIG. 1A is a block diagram illustrating some system and method steps for orbital design in case of partial thrust failure, according to an embodiment of the present disclosure.

FIG. 1A is a block diagram illustrating some system and method steps for orbital design in case of partial thrust failure, according to an embodiment of the present disclosure. For example, the method can be for controlling an operation of a vehicle in real time to rendezvous the vehicle with a target over a finite time horizon having multiple specified time periods.

Step 5 of FIG. 1A includes accepting data in real time including values of vehicle states and target states in a multi-object celestial system, and a predetermined subset of a number of operational thrusters that is less than a total number of operational thrusters of the vehicle, at a specified time period within the finite time horizon.

Step 7 of FIG. 1A includes identifying a target orbit location from the accepted data in real time.

Step 9 of FIG. 1A includes accessing a memory having unsafe regions, to select a set of unsafe regions corresponding to the target orbit location and the predetermined subset of the number of operational thrusters of the vehicle within the specified time period. Wherein the set of unsafe regions represents regions of space around the target in which any operation of the predetermined subset of the number of operational thrusters does not avoid collision with the target, guaranteeing collision trajectories with the target.

Step 11 of FIG. 1A includes formulating the set of unsafe regions as safety constraints, and updating a controller having a model of dynamics of the vehicle with the accepted data.

Step 13 of FIG. 1A includes generating control commands by subjecting the updated controller to the safety constraints to produce a rendezvous trajectory that avoids the set of unsafe regions, guaranteeing an operation of at least the predetermined subset of the number of operational thrusters, in the event of partial vehicle thruster failure results in a trajectory that does not collide with the target.

Step 15 of FIG. 1A includes outputting the control commands to activate or not activate one or more thrusters of the vehicle for the specified time period based on the control commands.

Embodiments of the present disclosure provide important solutions to orbital rendezvous which is a critical phase for missions that perform satellite servicing, active debris mitigation, in-space manufacturing, space station resupply, and planetary sample return. Safety analysis with partial thruster control of a rendezvous mission of the present disclosure can be used to evaluate the total probability of collision in the event that the maneuvering chaser spacecraft experiences a fault that results in a partial loss of maneuvering capability. Some key factors the present disclosure considers in determining the safety of the rendezvous mission can include a chosen approach trajectory, state estimations of the spacecraft and target, and probability of collision calculation such as the unsafe regions. Further, orbital rendezvous and proximity operations are an important process of accomplishing mission objectives, such that, orbital rendezvous is a key technology for space exploration. Wherein, orbital rendezvous provides or allows humans to get to the moon, assemble and supply space stations, and repair the Hubble space telescope, by non-limiting example. In fact, the systems and methods of the present disclosure can be applied to satellite servicing, orbital debris removal, in-space manufacturing, space station re-supply, and planetary science sample return missions. Wherein for each of these missions, the operation managers will have to decide what level of risk is acceptable, and what steps they can take to reduce the risk.

As noted as, safe rendezvous continues to be a "real problem", despite the numerous precautions to reduce mission risk. Over the last few years there have been several orbital rendezvous failures. For example, in 1997, an unmanned Russian Progress resupply vehicle collided with the Mir space station forcing astronauts onboard to seal off sections of the station. That same year, the ETS-VII rendezvous and docking demonstration vehicle experienced multiple anomalies during the final phases of rendezvous. In 2005, DARPA's Demonstration of Autonomous Rendezvous Technology (DART) mission experienced a fault that resulted in a collision. Thus, the systems and methods of the present disclosure provide mission stakeholders with an indication of mission risk, and just as important, provide solutions to address safe rendezvous risks, when facing partial loss of thruster control regarding safe rendezvous missions.

Figure 1B:
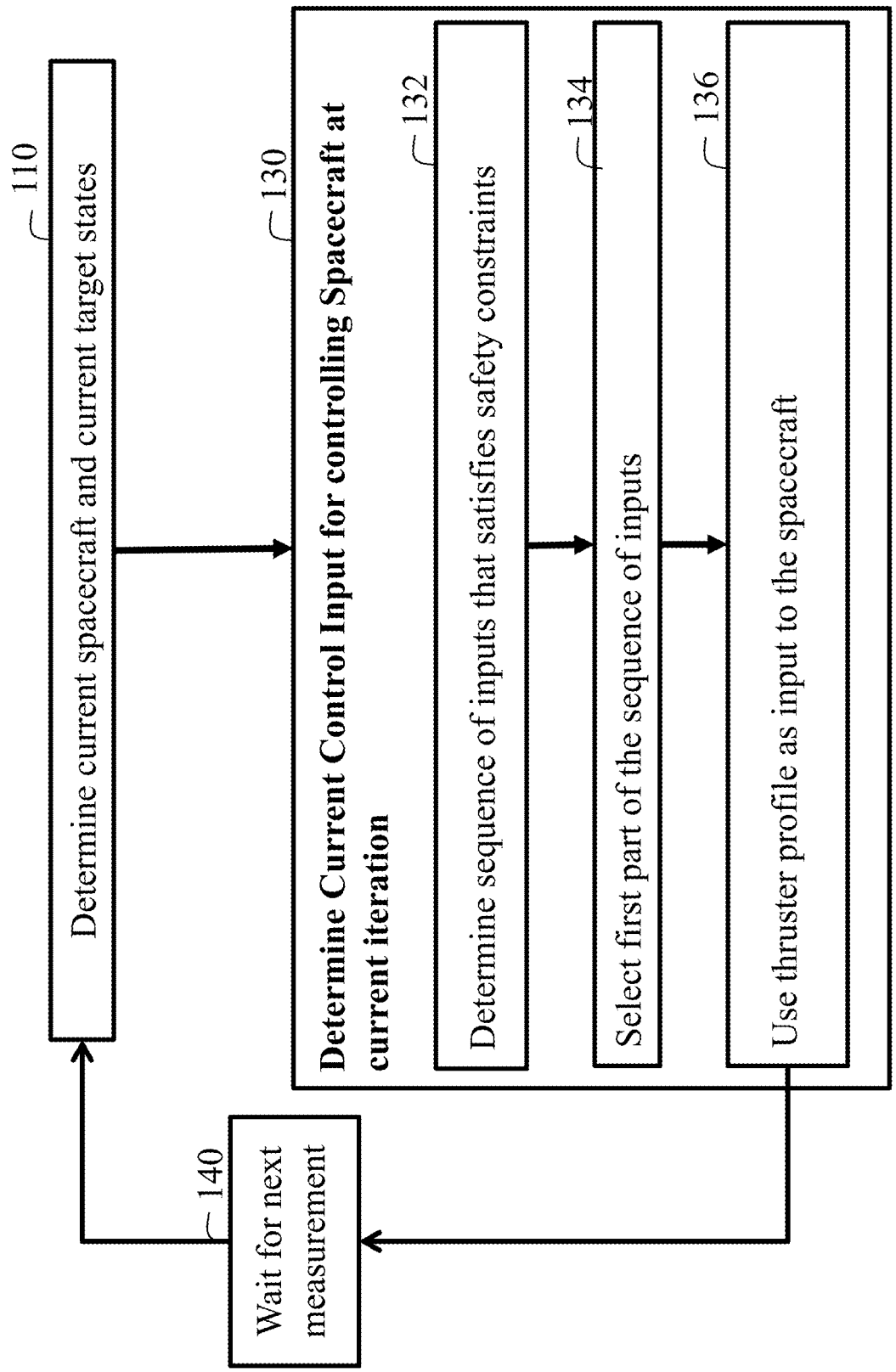
FIG. 1B is a block diagram illustrating a method for controlling an operation of a multi-object celestial system in case of partial thrust failure, according to some embodiments of the present disclosure.

FIG. 1B is a block diagram illustrating a method for controlling an operation of a multi-object celestial system in case of partial thrust failure, according to some embodiments of the present disclosure. For example, the method controls iteratively the operation of the controlled chaser spacecraft with control inputs determined using a model of the joint multi-object celestial system based on an optimization of a cost function.

An initial step 110 of FIG. 1B includes determining current states of the controlled chaser spacecraft and uncontrolled target, of which, the current states of the spacecraft and uncontrolled target can be determined using sensors, or other aspects such as hardware or software. In addition, the current states of the spacecraft and uncontrolled target can be obtained from communication with a ground command center located on Earth or another spacecraft located in outer space, e.g. GPS, relative range measurements, star trackers, horizon sensors, or the like. It is also possible to determine the current spacecraft state based on a previous control input determined for a previous iteration that is optimized with a previous cost function using a previous model of the spacecraft.

Still referring to FIG. 1B, the states determined in step 110 may be absolute states relative to the central body that the uncontrolled target and the controlled chaser spacecraft are orbiting. The states determined in step 110 may also be states of the chaser spacecraft relative to the target.

Additionally, or alternatively, in some implementations, the controller 101 includes an input interface 133 configured to accept data indicative of current values of states of the controlled spacecraft and the uncontrolled target in the multi-object celestial system aim to be determined and/or determined in step 110 implemented outside of the controller 101. As used herein, the states include one or combination of positions, and translational velocities of the controlled spacecraft and the uncontrolled target, and perturbations acting on the multi-object celestial system.

Step 130 of FIG. 1B determines a current control input for controlling the spacecraft at the current iteration using the current model of the joint multi-object celestial system dynamics.

Step 132 of FIG. 1B, the method uses the current model of the joint multi-object celestial system dynamics to determine a sequence of future inputs of thruster forces from the current time instant for a fixed amount of time in the future, so long as to at least obtain new state measurements. So that, the predicted future spacecraft states and inputs satisfy the safety constraints on the operation of the spacecraft and constraints on the control inputs.

Step 134 of FIG. 1B, includes the first part of the input sequence, for a duration equal to an amount of time needed to obtain a new measurement of the state of the spacecraft. Which is selected and applied to the next step 136, as the current control input to the spacecraft.

Step 136 of FIG. 1B, uses the thruster profile as an input to the spacecraft.

Step 140 of FIG. 1B, based on the determined current state of the controlled chaser spacecraft and uncontrolled target step 110 and the determined current control input step 130 to the spacecraft, a next state of the controlled chaser spacecraft and uncontrolled celestial body are determined, and at step 140, the controller waits until a new state measurement is received.

Figure 1C:
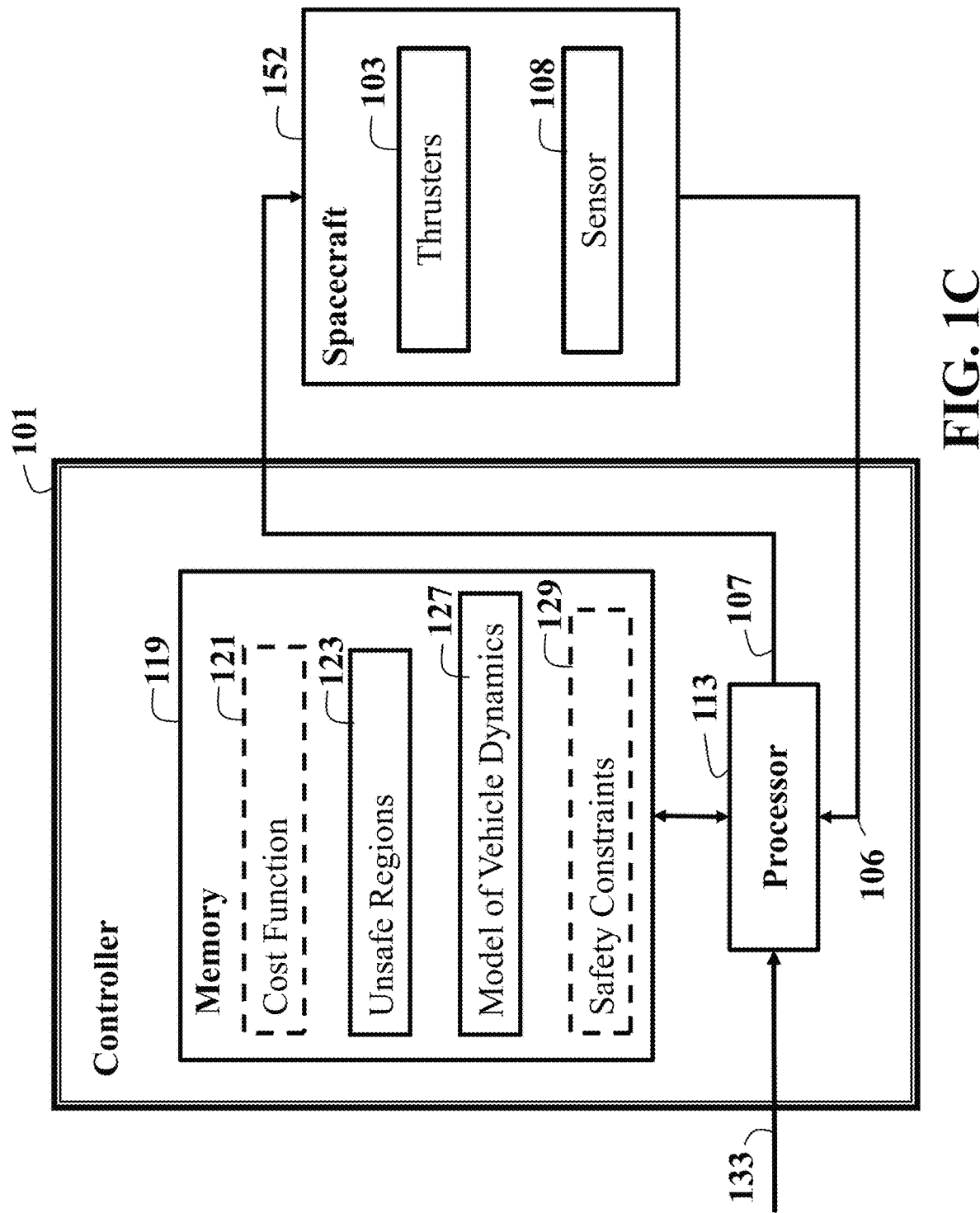
FIG. 1C is a block diagram illustrating some components of a controller implementing at least some steps of the method of FIG. 1B, according to some embodiments of the present disclosure.

FIG. 1C is a block diagram illustrating some components of a controller implementing at least some steps of the method of FIG. 1B, according to some embodiments of the present disclosure. The method of FIG. 1B, can include a control system or controller 101 that has at least one processor 113 for executing modules of the controller. The controller 101 can be in communication with a processor 113 and a memory 119. Wherein the memory can have at least one stored thereon including the cost function 121, the unsafe regions 123, and the safety constraints 129.

Further, the method of FIG. 1B can determine as shown in FIG. 1C control inputs 107 via the processor 113, using an updated controller (updated using accepted or current vehicle and target data) that is subject to the safety constraints. Wherein, the safety constraints are determined by corresponding the target orbit location with a set of unsafe regions from the stored unsafe regions 123 stored in the memory 119, and then formulating the set of unsafe regions as safety constraints. The safety constraints 129 are subjected to the updated controller having the model of dynamics of the vehicle 127, and then later stored in the memory 119. Wherein the determined control inputs 107 can be sent to the spacecraft 102. To that end, the controller 101 can included or be operatively connected to an output interface configured to submit the control commands 107 to the thrusters of the spacecraft. Further the spacecraft 152 can have thrusters 103 and sensors 108, among other components. The current state 106 of the spacecraft 152 can be obtained from the sensors 108 and communicated to the processor 113.

Still referring to FIG. 1C, at least one embodiment can include the processor 113 to determine at least one of the cost function 121, the unsafe regions 123, the model of dynamics of the vehicle 127, the safety constraints 129 during the control. For example, the control system 101 can execute method of FIG. 1C that controls iteratively the operation of the spacecraft 152 with control inputs of step 130 of FIG. 1B. It is contemplated that method of FIG. 1C could also be executed by the controller 101 based on a previously iteratively operation of the spacecraft 152, i.e. from a previously iterative control operation having a previous control input determined for a previous iteration that is optimized by a previous cost function using a previous model of the spacecraft.

Figure 1D:
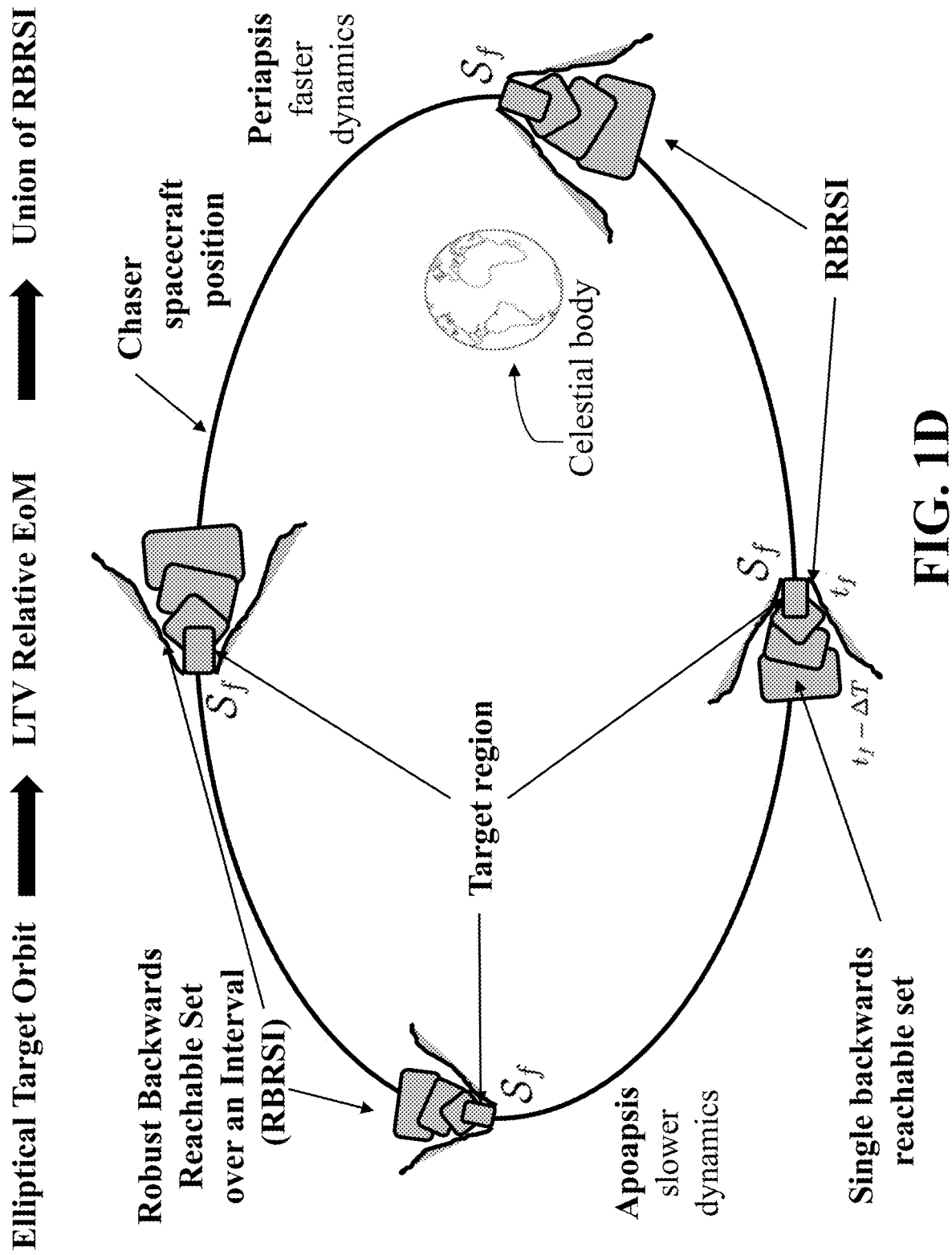
FIG. 1D is a schematic illustrating a representation of multiple backward reachable sets for multiple specified time periods projected onto a target orbital frame, according to some embodiments of the present disclosure.

FIG. 1D is a schematic illustrating a representation of multiple robust backward reachable sets for multiple specified time periods projected onto a target orbital frame, according to some embodiments of the present disclosure; A single backward reachable set of a target region at $\Delta T$ seconds before $t_f$ is shown projected onto a target orbital frame, according to some embodiments of the present disclosure. States in the $\Delta T$ backwards reachable set of the target region flow into the target region in $\Delta T$ seconds.

Still referring to FIG. 1D, the concepts from reachability (such as backwards reachable sets) and receding-horizon control are combined to design an online trajectory generation algorithm that produces safe rendezvous trajectories for a chaser spacecraft to its target on generic elliptic orbits. For achieving abort-safety, we compute the robust backwards reachable set over a time interval (RBRSI) from the target to determine the regions of state-space which for all admissible control sequence are steered to the target, thus corresponding to unsafe areas in which, in the event of partial loss of control, characterize the states that would lead to collision no matter the remaining available thrust. Thrust failure scenarios, i.e. predetermined subsets of a number of operational thrusters, are encoded in admissible control sets and are treated as if the control was a disturbance, that is, the RBRSI are computed for all possible controls in the admissible set. Thus, the RBRSI determine the regions of state-space for which all possible control sequences end up at the target within a specified time-period, i.e., no feasible evasive abort maneuvers exist.

Abort safety is a guarantee that during rendezvous, if there is partial loss of control, safe abort maneuvers exist and thus a chaser spacecraft can avoid a collision with the target.

Still referring to FIG. 1D, for computational tractability, the nonlinear relative equations of motion about the target's generic elliptic orbit around a celestial body are linearized, resulting in a set of linear time-varying (LTV) relative equations of motion (EoM). The LTV nature of the system means that the dynamics of a chaser spacecraft in the vicinity of periapsis (closest point to the central body) behave differently than at apoapsis (farthest point to the central body). Due to the LTV nature of the system, exact computation of the RBRSI is impossible, hence we conservatively approximate the unsafe region with offline computation of the union of RBRSI along the target's entire orbit. The union of RBRSI determines the unsafe region to be avoided, which is formulated as safety constraints for the online trajectory generation process.

Still referring to FIG. 1D, a model predictive control (MPC) policy is developed that enforces that the chaser spacecraft avoids the unsafe region as it rendezvous with a target or target region, thus ensuring that the chaser spacecraft remains outside of the union of RBRSI, and hence guaranteeing that in the event of a partial loss of control abort maneuvers exist and the chaser spacecraft thrusters can be operated in a manner in which the chaser spacecraft never collides with the target. The MPC policy can be referred to as an abort-safe MPC policy, an abort-safe control policy, a safe controller, throughout the disclosure.

Figure 2:
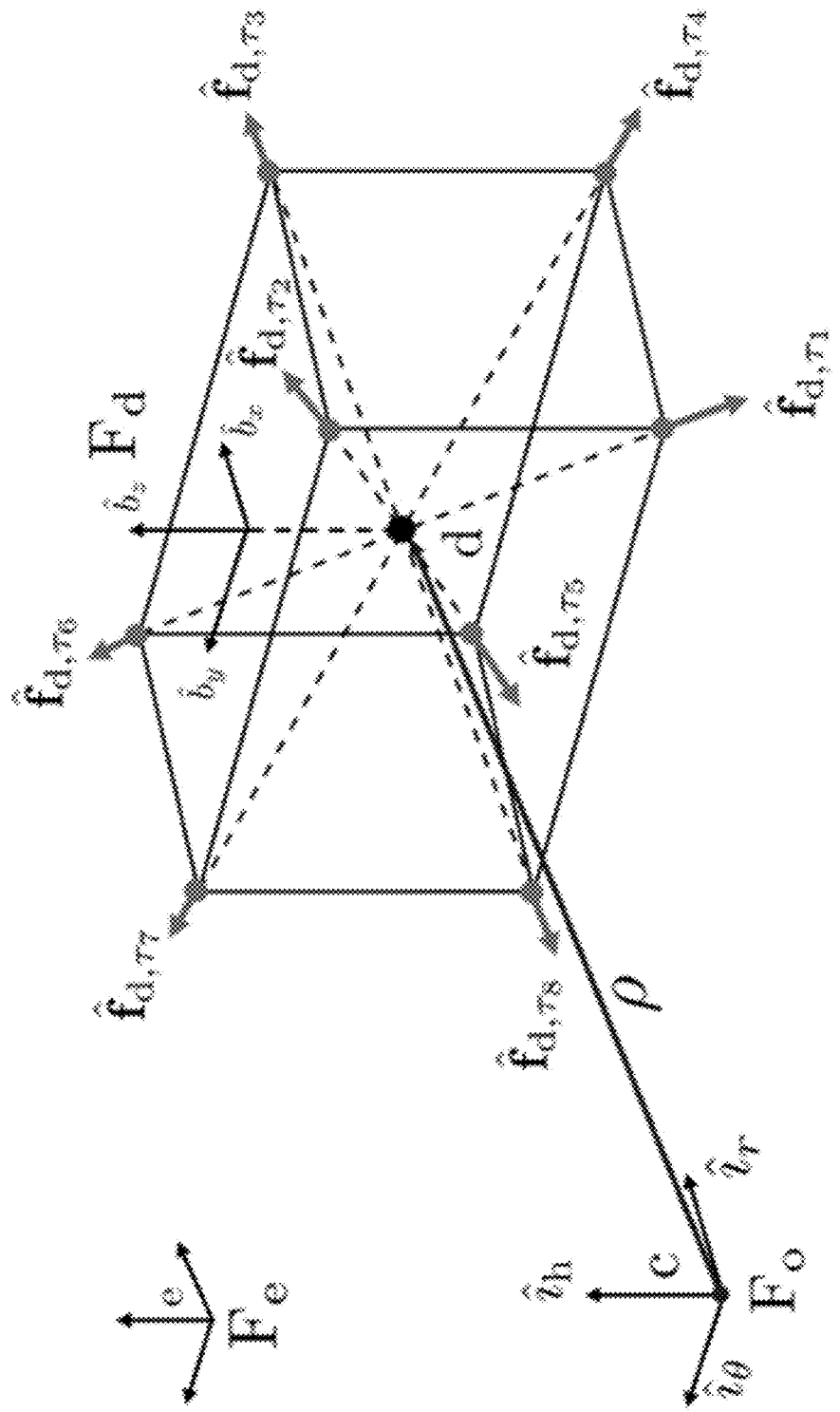
FIG. 2 is a schematic illustrating a deputy model and thruster configuration, according to some embodiments of the present disclosure.
Figure 3A:
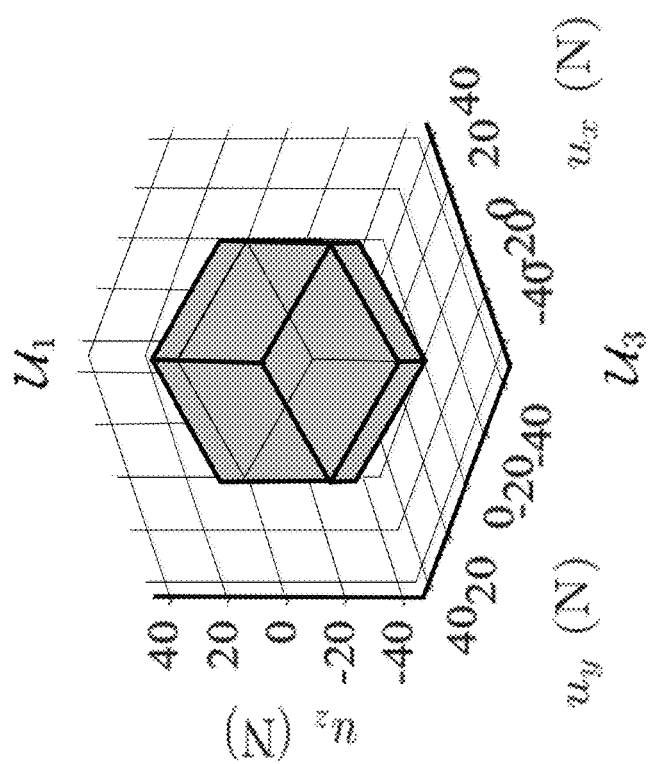
FIG. 3A, FIG. 3B, FIG. 3C, FIG. 3D are schematics illustrating four examples of admissible control sets U1, U2, U3, U4, corresponding to $\mathcal{M}_1=\mathcal{I}$, $\mathcal{M}_2=\{1, 2, 3\}$, $\mathcal{M}_3\{7, 8\}$ $\mathcal{M}_4=\{8\}$ respectively, for various working thruster modes, according to some embodiments of the present disclosure.
Figure 3B:
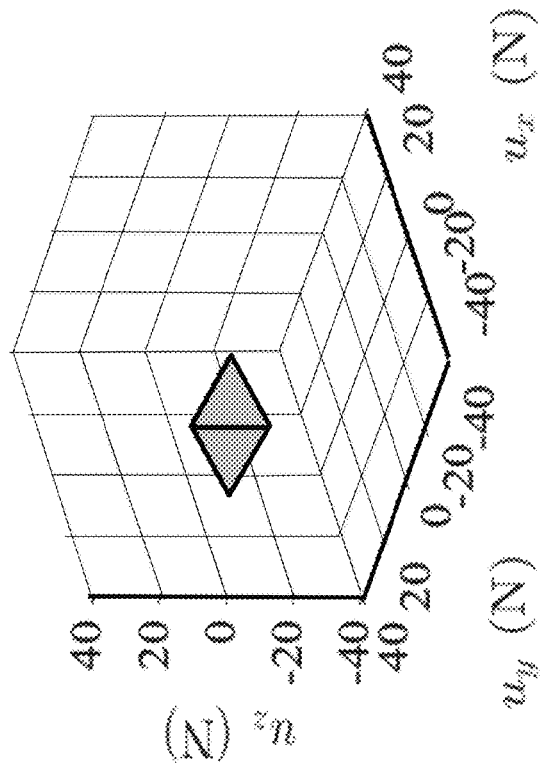
Figure 3C:
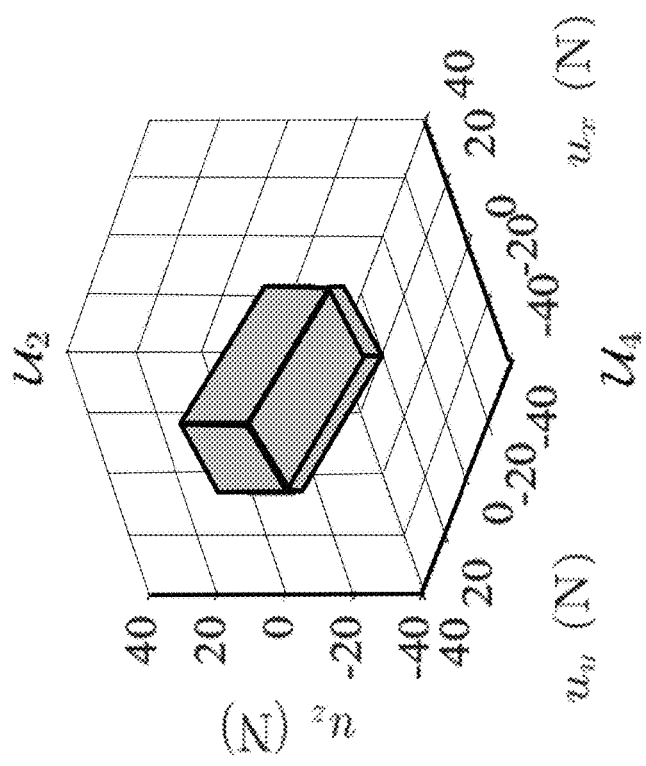
Figure 3D:
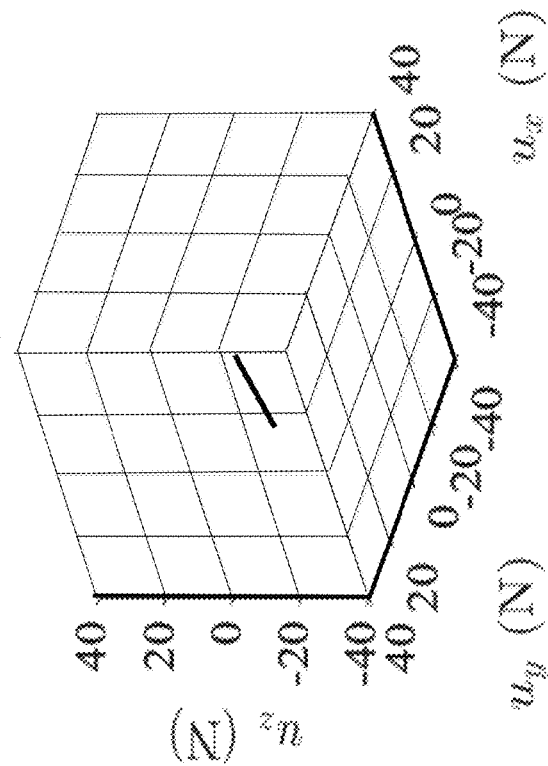

FIG. 2 is a schematic illustrating a chaser spacecraft model and thruster configuration, according to some embodiments of the present disclosure. For example, the spacecraft may be equipped with eight thrusters that are mounted at the corners of the spacecraft so that they aligned and produce pure forces that act on the center of mass of the spacecraft without producing any torques that would rotate the spacecraft. The controller will send signals to activate or deactivate the thrusters in order to move the spacecraft along a commanded trajectory.

For example, consider a chief and a deputy in orbit around a central body, e.g., Earth. The frame $F_e$ is the Earth-Centered Inertial (ECI) frame, e is an unforced particle, and it is assumed that e is collocated with the center of the Earth. The deputy's center of mass is denoted by d and has a deputy-fixed frame $F_d$. The chief's center of mass is denoted by c and has a chief-fixed frame $F_c$. The chief's angular velocity with respect to the inertial frame is $\omega_{c/e}$ and may be nonzero, i.e. the chief may be uncontrolled and tumbling. The chief's orbit frame $F_o = \{\hat{i}_r, \hat{i}_\theta, \hat{i}_h\}$ is Hill's frame with radial, along-track, and cross-track basis vectors. The vector $\hat{i}_r$ is parallel to the chief satellite's position vector, $\hat{i}_h$ points in the direction of the orbit's angular momentum, and $\hat{i}_\theta$ completes the right-hand rule. The deputy is controlled and assumed to be aligned with the chief's orbital frame $F_o$, i.e. $\omega_{d/o} = 0$, for simplicity and given that reorientation of the deputy spacecraft can be achieved much faster than its orbit control, by a reaction wheel attitude control system. Both the chief and deputy's bodies are assumed to be rigid and all external forces acting on the spacecraft are assumed to act on the center of mass of their respective bodies.

Still referring to FIG. 2, the translational equations of motion for the chief and deputy relative to the inertial frame $F_e$ are given by $$r_c'' = -\mu \frac{r_c}{\|r_c\|^3} + \frac{f_c}{m_c}, \tag{1a}$$

$$r_d'' = -\mu \frac{r_d}{\|r_d\|^3} + \frac{f_d}{m_d}, \tag{1b}$$

where $r_c$, $r_d$ are the position vectors of the chief and deputy centers of mass relative to the center of Earth, $m_c$, $m_d$ are the chief and deputy masses, $\mu$ is the gravitational constant of Earth, and $f_c$, $f_d$ represent perturbing forces acting on the chief and deputy, respectively. In general, these perturbations include orbital perturbations as well as control. In this study, the chief is assumed to follow Keplerian motion, i.e. $f_c = 0$, and we neglect orbital perturbations on the deputy.

Given a chief and deputy spacecraft, the position of the deputy relative to the chief is given by $$\rho = r_d - r_c. \tag{2}$$

Still referring to FIG. 2, taking the derivative of the relative position (2) with respect to the chief's orbital frame $F_o$ yields $$\dot{\rho} = r_d' - r_c' - \omega_{o/e} \times \rho. \tag{3}$$

Taking the derivative of the relative velocity (3) with respect to the chief's orbital frame $F_o$ yields $$\ddot{\rho} = r_d'' - r_c'' - \dot{\omega}_{o/e} \times \rho - \omega_{o/e} \times (\omega_{o/e} \times \rho) - 2\omega_{o/e} \times \dot{\rho}. \tag{4}$$

Substituting (1) into (4) yields the full nonlinear relative equations of motion. For $$\|\rho\| \ll \|r_c\|, \tag{5}$$

the equations of relative motion (4) can be linearized about the chief's trajectory and resolved in the chief's orbital frame $F_o$, yielding [15]

$$\delta\ddot{x} - \left(\frac{2\mu}{r_c^3} + \frac{h^2}{r_c^4}\right)\delta x + \left(\frac{2r_c' \cdot r_c}{r_c^4}h\right)\delta y - \left(\frac{2h}{r_c^2}\right)\delta\dot{y} = \frac{u_x}{m_c}, \quad (6)$$

$$\delta\ddot{y} + \left(\frac{\mu}{r_c^3} - \frac{h^2}{r_c^4}\right)\delta y - \left(\frac{2r_c' \cdot r_c}{r_c^4}h\right)\delta x + \left(\frac{2h}{r_c^2}\right)\delta\dot{x} = \frac{u_y}{m_c},$$

$$\delta\ddot{z} + \left(\frac{\mu}{r_c^3}\right)\delta z = \frac{u_z}{m_c},$$

where ${}^o\rho = [\delta x\ \delta y\ \delta z]^T$ is the relative position resolved in $F_o$, $r_c = \|r_c\|$, $h = \|r_c \times r_c'\|$ is the inertial specific angular momentum of the chiefs orbit, and ${}^o f_d = [u_x\ u_y\ u_z]^T$ is the control input applied to the deputy resolved in $F_o$.

Still referring to FIG. 2, as $r_c$ and h vary along the orbit, the equations of motion (6) result in the linear-time varying system $$\dot{x}(t) = A(t)x(t) + Bu(t), \quad (7)$$

where $x = [\delta x\ \delta y\ \delta z\ \delta\dot{x}\ \delta\dot{y}\ \delta\dot{z}]^T$, and $u = {}^o f_d$. In this work we consider a discrete time formulation of (7)

$$x_{t+1} = f(t, x_t, u_t) = A_\Delta(t)x_t + B_\Delta(t)u_t, \quad (8)$$

with sampling period $\Delta t$, which is assumed to be small enough not to lose significant behavior between samples.

Thrusters and Failure Modes

Still referring to FIG. 2, the deputy model and thruster configuration depicted eight thrusters rigidly fixed with respect to $F_d$ that provide thrust in lines coincident with their positions and the center of mass of the spacecraft such that they do not impart any torque. The total force applied to the deputy resolved in $F_o$ is $$u = {}^o f_d = \sum_{j=1}^{8} \gamma_j^o \hat{f}_{d,\tau_j}, \quad (9)$$

where $\gamma_j \in [0, u_{m,j}]$ is the magnitude of thruster j; $u_{m,j}$ is the maximum thrust of thruster j, ${}^o\hat{f}_{d,\tau_j} = C_d^o {}^d \hat{f}_{d,\tau_j}$ is the fixed thrust direction of thruster j resolved in $F_o$, and $C_d^o = I_3$ is the DCM that transforms a vector in $F_d$ to $F_o$, where we recall the assumption that the deputy is aligned with the chiefs orbital frame.

In the course of executing a rendezvous maneuver, any number of thrusters may fail. Given the set of thruster indices $\mathcal{I}\{1, 2, \ldots, 8\}$, the set of working thruster combinations is $\mathcal{M} = 2^{\mathcal{I}}$. We let $n_F = |2^{\mathcal{I}}|$, so that $\mathcal{M}_i \in \mathcal{M}$, $\forall i \in \{1, \ldots, n_F\}$ denotes a specific set of functional thrusters, also called a thrust mode. $\mathcal{M}_i = \mathcal{I}$ indicates nominal operation of all thrusters, and $\mathcal{M}_i = \emptyset$ indicates total loss of control. The set of all possible failure modes is $\mathcal{FM} = \mathcal{M} \setminus \mathcal{I}$. The admissible control set $U_i$ associated with thrust mode $\mathcal{M}_i \in \mathcal{M}$ imposing $u \in \mathcal{U}_i$ is $$u_i = \bigoplus_{j \in M_i}^{|M_i|} \left\{ \gamma_j^o \hat{f}_{d,\tau_j} : \gamma_j \in [0, u_{m,j}] \right\} \quad (10)$$

FIG. 3A, FIG. 3B, FIG. 3C, FIG. 3D are schematics illustrating four examples of admissible control sets U1, U2, U3, U4, corresponding to $\mathcal{M}_1 = \mathcal{I}$, $\mathcal{M}_2 = \{1,2,3\}$, $\mathcal{M}_3 = \{7,8\}$ $\mathcal{M}_4 = \{8\}$ respectively, for various working thruster modes, according to some embodiments of the present disclosure.

Problem Statement

A compact target set S/fixed in the orbital frame $F_o$ is given, that includes the origin and where the extension along the position dimensions over-approximates the chiefs physical geometry, and the extension along the velocity dimensions spans the deputy's admissible operational velocities. The set $S_f$ defines a region in state-space that the deputy must avoid in the event of partial thruster failure. The objective of the abort-safe spacecraft rendezvous problem is for the deputy to approach the chief in a manner that, in the event of a thruster failure $\mathcal{M}_i \in \mathcal{FM}$ Fat a generic discrete time instant $t_{fail}$, there exists an N step abort sequence such that the deputy does not enter $S_f$ for $t \in [t_{fail}, t_{fail+N}]$, i.e. there exists $u_{t_{fail}}, \ldots, u_{t_{fail+N-1}} \in \mathcal{U}_i$ such that $x_t \notin S_f$ for all discrete times $t \in f_{fail}, t_{fail+N}]$.

Robust Reachable Sets and Abort Safety

Referring back to FIG. 1D, abort safety is enforced by maintaining the deputy vehicle outside of the unsafe region of state-space, that is, the region where if a failure occurs, a safe abort does not exist i.e. a collision cannot be avoided. We determine such region by the robust backwards reachable sets (RBRS) of the target set with respect to the input set, that is the set of states that will enter the target set regardless of the inputs. Thus, when the failure occurs and the state is in the RBRS, no admissible control exists to avoid collision.

Definition 1: Given $x_{t+1} = f(t, x_t, u_t)$, where $u \in \mathcal{U}$, and final time $t_f$, the N-step robust backward reachable set $\tilde{\mathcal{R}}_b$ $(n; \mathcal{S}_F, \mathcal{U}_F)$ of target region $\mathcal{S}_F \subseteq \mathbb{R}^N$ is $$\tilde{\mathcal{R}}_b(0; \mathcal{S}_f, \mathcal{U}, t_f) = \mathcal{S}_f,$$

$$\tilde{\mathcal{R}}_b(j; \mathcal{S}_f, \mathcal{U}, t_f) = \{x \in \mathbb{R}^n : f(t_f-j, x, u) \in \tilde{\mathcal{R}}_b(j-1; \mathcal{S}_f, \mathcal{U}, t_f), \forall u \in \mathcal{U}\}. \quad (11)$$

Referring back to FIG. 1D, here the RBRS is the set of initial conditions at time $t_0 = t_f - N$ from which the deputy will not be able to avoid collision at time $t_f$, regardless of the admissible control sequence applied.

Definition 2: The robust backwards reachable set over the time interval $t \in [t_0, t_f]$ (RBRSI), where $t_0 = t_f - N$, is the union of the j-steps RBRS, $$\tilde{R}_N(S_f, U, t_f) = \bigcup_{j=0}^{N} \tilde{R}_b(j; S_f, U, t_f). \quad (12)$$

The RBRSI denotes the set of states $\bar{x}$ for which there exists $t \in [t_0, t_f]$, such that from $x(t) = \bar{x}$, the deputy will not be able to avoid collision at time $t_f$, regardless of the admissible control sequence applied.

Next, we account for changing final time, considering that the orbit, and hence the time-varying system, is periodic. To this end the orbit-RBRSI is the union of the RBRSI over $[t_0, t_f]$, with $t_f - t_0 = N$, for $t_f$ that varies along one orbit $$\tilde{R}_N(S_f, U) = \bigcup_{t_f = t_p+1}^{2t_p} \tilde{R}_N(S_f, U, t_f), \quad (13)$$

where $t_p$ is the orbital period, and we assumed $N < t_p$ due to the type of spacecraft maneuver we target.

By taking the union of the RBRSI for changing final time around one orbit, (13) contains sets of states for which there exists a time in the chief's periodic orbit such that a collision will necessarily occur after at most N steps, $U_{j=0}^{N} \tilde{\mathcal{R}}_b(j; \mathcal{S}_f, \mathcal{U}, t_0+j)$.

Remark 1: We arrive at the construction of $\mathcal{R}_N(\mathcal{S}_f, \mathcal{U})$ "backwards," by fixing first the final time and considering all initial times within N-steps in (12), and then considering all final times within the orbit in (13). We did that to stay closer to the definition and computation of RBRS, which are backwards in time. An alternative approach is to first define the set of states that necessarily collide with the chief within N steps for a fixed initial time, instead of (12), and then take the union for all t0 within the orbit. This provides the same result since the union is commutative and associative.

Case of Polytopic Target Set and LTV Dynamics

When the dynamics are linear as in (7) and the target set $S_f$ is a polytope, the RBRS is also a polytope and is computed by solving linear programs. Consider the target set $\mathcal{S}f_{Let} = \mathcal{P}(H_f, k_f)$. Let the j-steps RBRS from final time $t_f$ be $\tilde{\mathcal{R}}_b(j; \mathcal{S}_f, \mathcal{U}, t_f)$, the j+1-steps RBRS is $$\tilde{R}_b(j+1; S_f, U, t_f) = \{x \in \mathbb{R}^n : H_{j+1}x \leq k_{j+1}\}, \text{ where}$$

$$H_{j+1} = H_j A_\Delta(t_f - (j+1)), \quad (14a)$$

$$[k_{j+1}]_i = \min_{u \in U}[k_j]_i - [H_j]_i B_\Delta(t_f - (j+1))u. \quad (14b)$$

In practice, additional linear programs to the ones in (14b) are solved to remove redundant hyperplanes for obtaining a minimal representation of $\mathcal{P}(H_j, k_j)$.

Figure 4A:
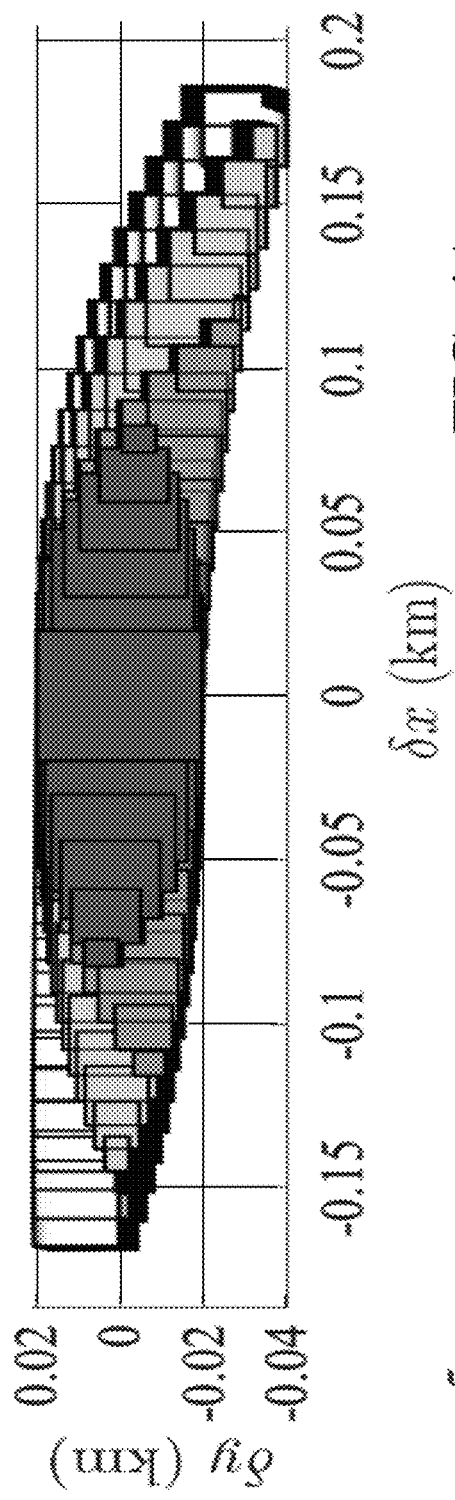
FIG. 4A is a graph illustrating sections of the robust backwards reachable set over the time interval (RBRSI) for $U=U_1$, $U_2$, $U_3$, $U_4$, from dark to light, according to some embodiments of the present disclosure.

FIG. 4A is a graph illustrating sections of the robust backwards reachable set over the time interval $t \in [t_0, t_f]$ (RBRSI) for $U=U_1$, $U_2$, $U_3$, $U_4$, from dark to light, for $\delta z = \delta \dot{y} = \theta \dot{z} = 0$ and $\delta \dot{x} \in \{-0.0015, 0, 0.0015\}$ m/s, according to some embodiments of the present disclosure.

Figure 4B:
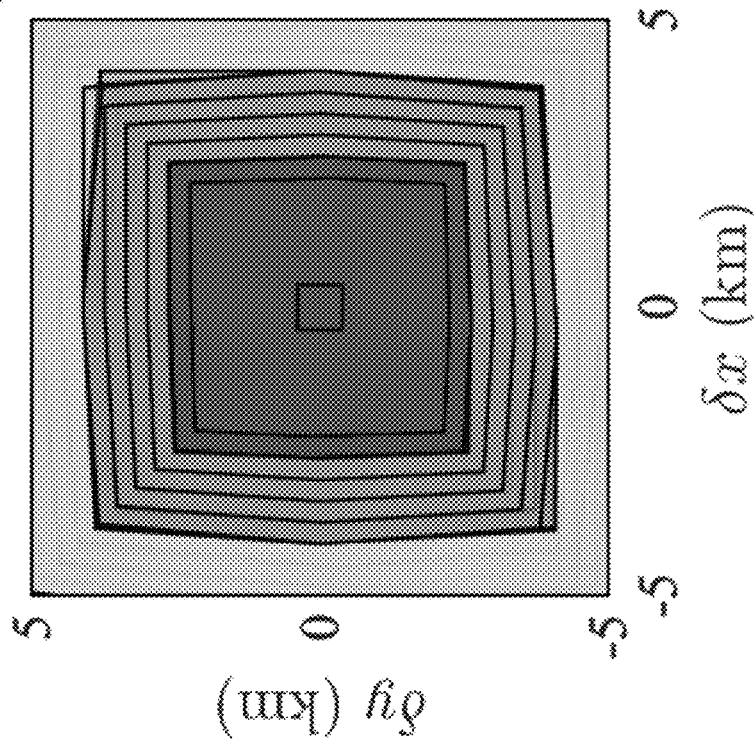
FIG. 4B is a graph illustrating shows the projection of the same RBRSI set of FIG. 4A onto the orbital plane, $\delta x$, $\delta y$, according to some embodiments of the present disclosure.

FIG. 4B is a graph illustrating shows the projection of the same RBRSI set of FIG. 4A onto the orbital plane, $\delta x$, $\delta y$, according to some embodiments of the present disclosure. As expected, the RBRSI gets larger as the spacecraft becomes increasingly under-actuated, indicating that a larger portion of the state space is unsafe. When the RBRS is computed for all thrusters failed, i.e., $\mathcal{M}_i = \emptyset$, it becomes the set of unsafe states, i.e. initial conditions for which free-drift trajectories enter $S_f$. Noted, is that ellipsoids are used instead of polyhedral.

Abort-Safe Sets

Consider a time interval $[t_0, t_f]$, and a target set $S_f$ constant in such interval. Given the state at an initial time $t_0$, the state at any time $t > t_0$ is found using $$x_t = \Phi(t, t_0) x_0 + C \hat{u}, \quad (15)$$

where C is the controllability matrix of the LTV system, $\hat{u}^T = [u_{t-1}^T \ldots u_{t_0}^T]$, and $\Phi(t, t_0) = A_\Delta(t) A_\Delta(t-1) \ldots A_\Delta(t_0)$ is the $t_0$-to-t is the $t_0$-to-t transition matrix. For the sake of notation let $$x_t = \phi(t; x_0, \tilde{u}, t_0), \quad (16)$$

where $\tilde{u} \in \mathcal{U}^h$, and, with a little abuse of notation, $h \geq t - t_0$, i.e., we may include more inputs in $\tilde{u}$ even though the ones with indexes $j > t-1$ have no impact on $x_t$. Letting $t_f - t_0 = N$, we define the safe set $\mathcal{X}_N^{safe}$ as the set of initial conditions that can be made to not collide with $S_f$ within the desired interval $$\mathcal{X}_N^{safe} = \{x \in \mathbb{R}^n : \exists \tilde{u} \in \mathcal{U}^N, \phi(t; x_0, \tilde{u}, t_0) \notin \mathcal{S}_f \ \forall t \in [t_0, t_f]\}.$$

Proposition 1: Let $x_0 \in \mathcal{R}_N(\mathcal{S}_f, \mathcal{U})^c$. Then, for any $t_0$ and $t_f = t_0 + N$, there exists $\tilde{u} \in \tilde{\mathcal{U}}^N$, such that $\phi(t; x_0, \tilde{u}, t_0) \notin \mathcal{S}_f$, for all $t \in [t_0, t_f]$.

Hence, $$\mathcal{X}_N^{safe} = \mathcal{R}_N(\mathcal{S}_f, \mathcal{U})^c. \quad (17)$$

Proof: By construction (12), (13), $\mathcal{R}_N(\mathcal{S}_f, \mathcal{U})$, contains all the initial conditions $x_0$ such that for all $\tilde{u} \in \mathcal{U}^N$ there exists $t \in [t_0, t_0+N]$ such that $\phi(t; x_0, \tilde{u}, t_0) \in \mathcal{S}_f$. The properties of the complement $\mathcal{R}_N(\mathcal{S}_f, \mathcal{U})^c$ are obtained by negating the properties of $\mathcal{R}_N(\mathcal{S}_f, \mathcal{U})$. Thus, $\mathcal{R}_N(\mathcal{S}_f, \mathcal{U})^c$ contains the initial conditions $x_0$ such that there exists $\tilde{u} \in \mathcal{U}^N$ such that for all $t \in [t_0, t_f]$, $\phi(t; x_0, \tilde{u}, t_0) \notin \mathcal{S}_f$, which is the desired safety condition. The validity for any $t_0$ is due to (11) and to including in (13) the RBRSI for all $t_f \in [t_p+1, 2t_p]$, which covers all the time instants by considering that the LTV system is periodic with period $t_p$. Thus, $\mathcal{X}_N^{safe} = \mathcal{R}_N(\mathcal{S}_f, \mathcal{U})^c$.

Still referring to FIG. 4A and FIG. 4B, due to the definition of $\mathcal{X}_N^{safe}$, if the state is kept inside it, the existence of a control N sequence that avoids the set $S_f$ in any interval $[t_0, t_0+N]$ is guaranteed.

Abort-Safe Rendezvous Control

Next, we develop an abort-safe control policy that exploits the safe set (17) and its complement (13). Specifically, we develop a model predictive control (MPC) policy that generates a trajectory constrained to remain within (17), and hence outside its complement (13), while minimizing a cost function designed based on performance metrics.

The MPC policy solves the optimal control problem $$\min_{U_t} E(x_{N_p|t}) + \sum_{k=0}^{N_p-1} F(x_{k|t}, u_{k|t}) \quad (18a)$$

$$s.t. \ x_{k+1|t} = A_\Delta(t+k) x_{k|t} + B_\Delta(t+k) u_{k|t} \quad (18b)$$

$$g_t(x_{k|t}, u_{k|t}) \leq 0 \quad (18c)$$

$$u_{k|t} \in U(t) \quad (18d)$$

$$x_{0|t} = x_t \quad (18e)$$

where $N_p$ is the prediction horizon length, usually (much) smaller than N in (13), the prediction model (18b) is (8), (18c) is the constraint ensuring that collision can be averted in presence of propulsion system failures, and $\mathcal{U}(t) \in \{\mathcal{U}_i\}_i$ is the input set at time t, which depends on the propulsion system condition according to (10). Since the control sequence over the horizon is $U_t = (u_{0|t} \ldots u_{N_p-1|t})$, the following control is applied as an input $$u_t = \kappa_{mpc}(x_t) = u_{0|t}^*, \quad (19)$$

where $U_t^* = (u_{0|t}^* \ldots u_{N_p-1|t}^*)$ is the optimizer of (18).

Safety Constraints

For (18c) we construct the unsafe set as the union of the orbit-RBRSI in (13) over the input sets (10). Since some failure modes may not need to be considered, e.g., they cannot occur or the spacecraft may be re-oriented to change the location of faulty thrusters, the unsafe set is constructed from given $q \leq n_F$ input sets (10) as $$\overline{R}_N^{rdv}(S_f) = \bigcup_{i=1}^{q} \overline{R}_N(S_f, U_i). \quad (20)$$

In (20), it is enough to consider all input sets that are not supersets of others, i.e., $\{\mathcal{U}_i: i, j \in \{1, \ldots q\}, \exists j, \mathcal{U}_i \supseteq \mathcal{U}_j\}$, so that we can ignore the input set for nominal conditions. While ideally (18c) could be implemented simply as $x_{k|t} \in \mathcal{X}_N^{safe} = \mathcal{R}_N^{rdv}(\mathcal{S}_f)^c$, such a constraint is non-convex and will make (18) hard to solve numerically. Instead, we impose constraints on the state to remain outside of (20) by computing a hyperplane that excludes (20) from the feasible space of (18), based on the following well known result.

Result 1: ([16, Prop.3.31]) Given polyhedra $\mathcal{P}_1(H_1, k_1)$, $\mathcal{P}_2(H_2, k_2)$, it holds that $\mathcal{P}_2(H_2, k_2) \supset \mathcal{P}_1(H_1, k_1)$, if and only if there exists a non-negative matrix $\Lambda$ such that $$\Lambda H_1 = H_2$$

$$\Lambda k_1 \leq k_2, \tag{21}$$

Given a subset of the polyhedra $\{P(H_i^{\bar{\mathcal{R}}}, k_i^{\bar{\mathcal{R}}})\}_{i=1}^{\ell}$ within $\mathcal{R}_N^{rdv}(\mathcal{S}_f)$, where $H_i^{\bar{\mathcal{R}}} \in \mathbb{R}^{n_{ci} \times n}$, we use Result 1 to construct a half space $\mathcal{P}_h(h,1) = \{x \in \mathbb{R}^n : hx \leq 1\}$, such that $\mathcal{P}_h(h,1) \supset \{\mathcal{P}(H_i^{\bar{\mathcal{R}}}, k_i^{\bar{\mathcal{R}}})\}_{i=1}^{\ell}$. Give $\bar{x} \in \mathbb{R}^n$, let $h^*(\bar{x})$, $\{\lambda_i^*(\bar{x})\}_{i=1}^{\ell}$, $s^*(\bar{x})$ be the solution of $$\min_{s,h,\{\lambda_i\}_{i=1}^{\ell}} -s \tag{22a}$$

$$s.t. \; s \geq 0 \tag{22b}$$

$$h\bar{x} \geq 1 + s \tag{22c}$$

$$[\lambda_i]_j \geq 0, j = 1, \ldots, n_{c_i} \tag{22d}$$

$$\lambda_i H_i^{\bar{\mathcal{R}}} = h \tag{22e}$$

$$\lambda_i k_i^{\bar{\mathcal{R}}} \leq 1, i = 1, \ldots, l \tag{22f}$$

where $\lambda_i \in \mathbb{R}^{1 \times n_{ci}}$, for all $i = 1, \ldots, \ell$. Any feasible solution of the linear program (22) is such that $\mathcal{P}_h(h,1) \supset \{P(H_i^{\bar{\mathcal{R}}}, k_i^{\bar{\mathcal{R}}})\}_{i=1}^{\ell}$. Furthermore, any feasible solution of (22) is such that $\bar{x} \notin \mathcal{P}_h(h,1)$, and the cost function (22a) maximizes the "distance" of $\bar{x}$ to the half space $\mathcal{P}_h(h^*,1)$, for reasons that will be clear next.

At any time t, we construct (18c) exploiting the optimal trajectory according to (18) at time t−1, $(x^*_{0|t-1}, \ldots x^*_{N_p|t-1})$. Given $x^*_{k|t-1}$, $k \in \{1, \ldots, N_p\}$, we select the $\ell$ closest polyhedral among those in $\mathcal{R}_N^{rdv}(\mathcal{S}_f)$ based on the distance $$d(x^*_{k|t-1}, P_i) = \min_y \|x^*_{k|t-1} - y\|_2 \tag{23}$$

$$s.t. \; y \in P_i.$$

Then, we compute $h_{k|t} = h(x^*_{k+1|t-1})$ from (22) based on the selected $\{P_i\}_{i=1}^{\ell}$ and implement (18c) as it complement $$-h_{k|t} x_{k|t} \leq -1 - \rho \tag{24},$$

where $\rho > 0$ is an arbitrarily small constant, in order for (18c) to be feasible in a closed set, and possibly to add a safety margin. Since $\mathcal{P}_h(h,1) \supset \{P_i\}_{i=1}^{\ell}$, its complement (24) does not intersect $\{P_i\}_{i=1}^{\ell}$.

Remark 2: If $\ell$ is chosen to include all polyhedral of $\mathcal{R}_N^{rdv}(\mathcal{S}_f)$, the feasible set of (24) is contained in $\mathcal{X}_N^{safe}$. We consider the possibility of including only the subset of closest polyhedral to take advantage of the receding horizon nature of (19) for reducing the computational burden of (18) and (22), and to avoid possible infeasibility of (22), which are local (over)-approximations of $\mathcal{R}_N^{rdv}(\mathcal{S}_f)$. In fact, $\bar{\mathcal{R}}_N^{rdv}(\mathcal{S}_f)$ considers all terminal times around the orbit, while the final approach of the rendezvous maneuver considered here terminates in a small, albeit difficult to predict, fraction of the orbital period. Cost function (22a) is meant to increase the residual of $x^*_{k|t-1}$ in satisfying (24), so that the deputy has more clearance to maneuver and select an optimal trajectory without riding on or near the constraint, if possible.

Cost Function and Overall Algorithm

In order to obtain in (18) a linear quadratic MPC, we design the stage cost and the terminal cost in (18a) as $$F(x,u) = x^T Q x + u^T R u, \tag{25a}$$

$$E(x) = x^T M x \tag{25b}$$

where the weight matrices $Q = Q^T \geq 0$, $R = R^T > 0$, $M = M^T > 0$ are selected to achieve the desired performance. The primary objective is to approach the chief, which amounts to reaching zero position and velocity, and can be affected by Q. A secondary objective is to minimize the total required propellant, since this allows for increased payload, which often requires minimizing the thrust, and hence is affected by R. The terminal cost M is usually chosen for obtaining stability properties, although here these are less relevant due to the formulation aiming at ensuring safety should a thruster failure occur.

FIG. 5 is illustrating an algorithm associated with safe rendezvous control, where the unsafe set (20) is compared offline, since the algorithm is computationally demanding and does not require real-time data, according to some embodiments of the present disclosure. For example, the overall algorithm is described in Algorithm 1, where the unsafe set (20) is computed offline, since it is computationally demanding but does not require real-time data.

Simulation Results

Three simulations are demonstrated that developed this approach. We run the discrete-time MPC (18), (19) in closed-loop with the continuous-time model (4) resolved in $F_o$. The number of steps in the MPC horizon and the MPC sampling period are $N_p = 8$, $t_s = 30$ s. The weight matrices in the cost function (18a) are $Q = 10^3 \cdot I_6$, $R = I_3$, $M = Q$. The mass of the deputy spacecraft is $m_c = 4000$ kg. Each thruster can apply a maximum thrust of $u_m = 0.02$ kN. The chief set is defined by a polytope with position bounds $p_m = 0.02$ kin and velocity bounds $p_m = 0.02$ km and velocity bounds $v_m = 6$ ms/s, yielding $\mathcal{S}_f = \mathcal{P}(H_f, k_f)$, $H_f = [-I_6 I_6]^T$, and $k_f = [p_m \; v_m \; p_m \; v_m]^T \in \mathbb{R}^{12}$, where $p_m = p_m \mathbb{1}_{1 \times 3}$ km and $v_m = v_m \mathbb{1}_{1 \times 3}$ m/s. For all of the simulation cases, the chief's initial conditions are defined by the following classical orbit elements $oe^T = [a \; e \; i \; \omega \; \Omega \; f]^T$ vector $oe^T = [7420$ km $0.1 \; 0.0° \; 0° \; 0° \; 140°]^T$, which yields an orbital period of 106 min. The LTV RBRSI sets are computed for a quarter of the orbital period, such that the safety horizon is $$N = \left\lceil \frac{t_p}{4 \Delta t} \right\rceil + 1 = 54$$

and its sampling period is $\Delta t \leq t_s$.

The failure occurs at $t_{fail}$, when the state is $x(t_{fail})$, so that for $t < t_{fail}$, $u_t \in \mathcal{U}_1$, which corresponds to $\mathcal{M}_1 = \mathcal{I}$, i.e., nominal control. For $t \geq t_{fail}$, $u_t \in \mathcal{U}_i$ where $\mathcal{M}_i \in \mathcal{FM}$, i.e., some thrusters have failed. For $t \geq t_{fail}$ we set $Q$, $M = 0$ so that the only objective is to avoid the constraints, i.e., safety. Next we show the behavior of the safe controller, that is designed as described in Section IV to be safe in case of partial thruster failure by enforcing x∈$\mathcal{X}_N^{safe}$, so that safe abort maneuvers exist, as per Proposition 1. We compare it with a standard design, called unsafe controller, that only aims at avoiding $S_f$ using that itself as a constraint, yet has no formal guarantees.

Figure 9:
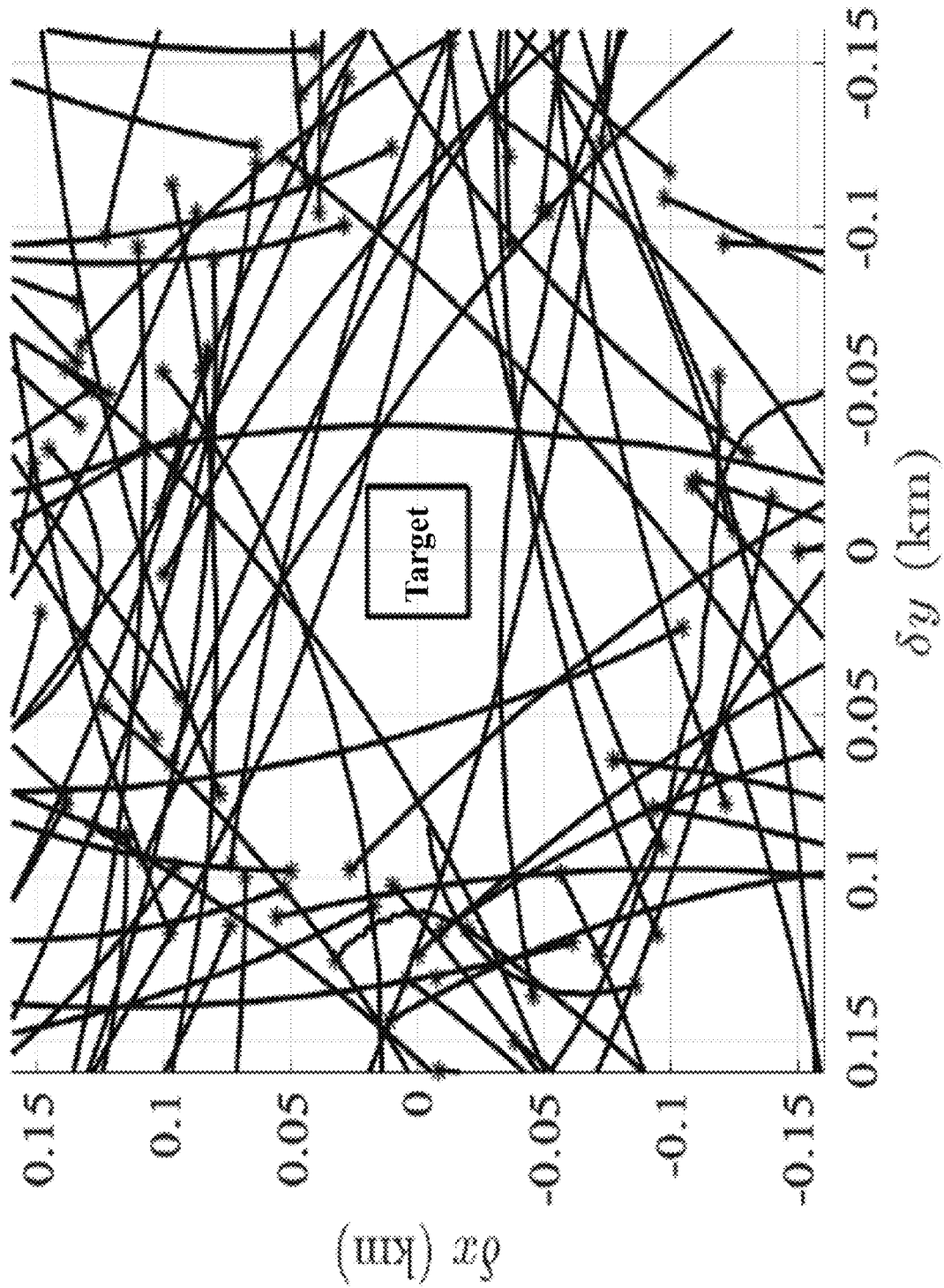
FIG. 9 is a graph illustrating a simulations with safe controller for multiple safe initial conditions, $x(t_0)\in\mathcal{X}_N^{safe}$, such that only 1 thruster remains functional after the failure, i.e., $\mathcal{M}_4=\{8\}$, and collisions with the target $S_f$ can be avoided, according to some embodiments of the present disclosure.

Finally, we briefly discuss the impact of enforcing the safety constraints in terms of the total change in velocity of the spacecraft, which amounts to the mass-independent propellant consumption and for the maneuver is given by $\hat{\Delta V}=\Sigma_{i=0}^{N-1}\|B\hat{u}_i\|\cdot\Delta t$ Safe Controller Vs. Unsafe Controller In this section we compare the unsafe and safe controllers. In FIG. 9, the dashed lines represent the part of the trajectory before the failure time t∈[$t_0$, $t_{fail}$], wherein in these simulations $t_{fail}$=240 s, while the solid lines represent the part after the failure time and within the safety horizon, t∈[$t_{fail}$, $t_{fail}$+N]. The mark on the trajectory indicates the position at which the failure occurs, x($t_{fail}$). The unsafe approach is shown in red while the safe approach is shown in blue. The positions within the target set $S_f$ are shown as a transparent cube. For these simulations, q=1 so safety is only maintained with respect to one failure mode in each trajectory.

Figure 6:
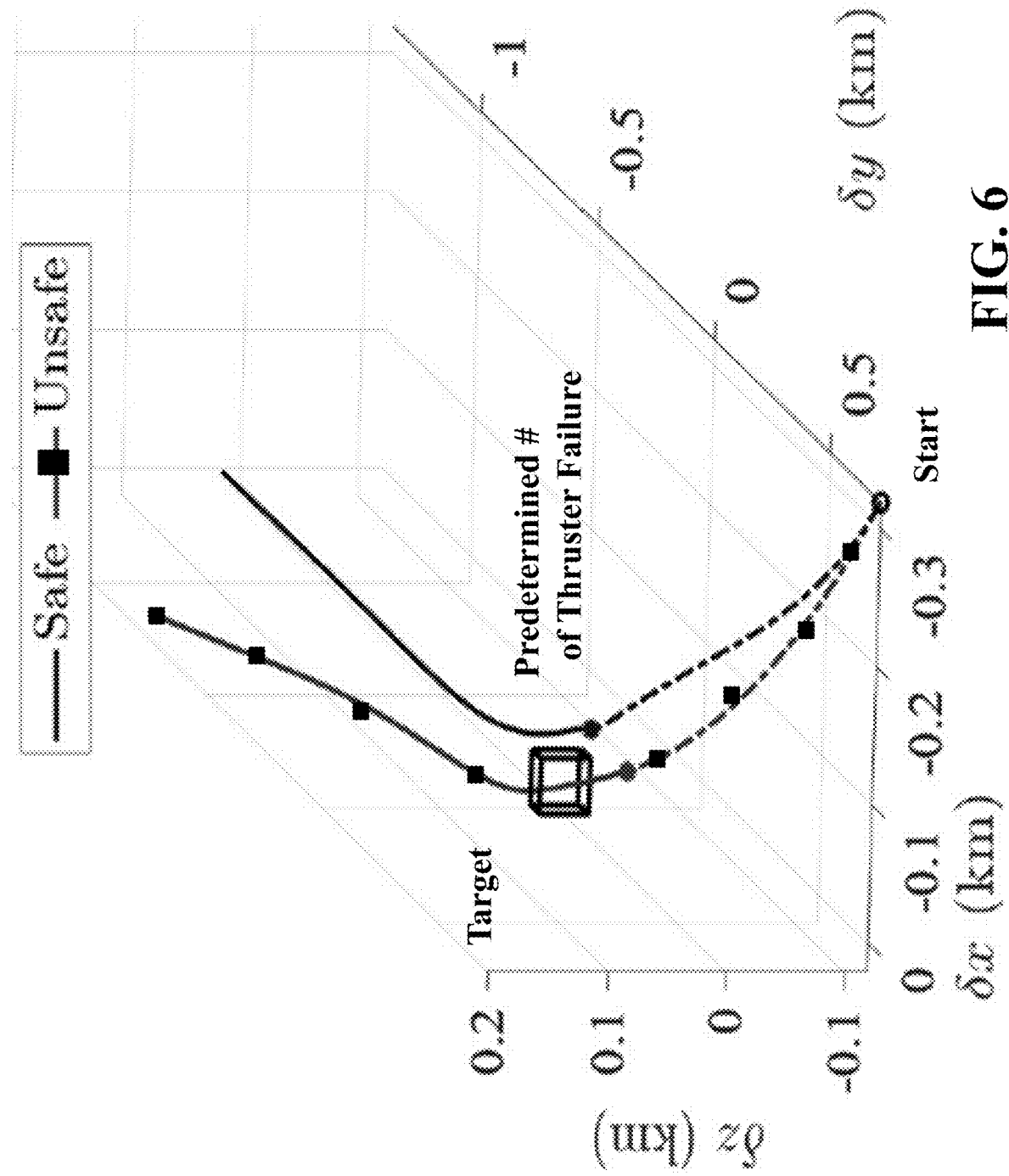
FIG. 6 is a graph illustrating a position history for the safe and unsafe controllers when 1 thruster fails, i.e., $\mathcal{M}_5=\mathcal{I}\backslash\{1\}$, according to some embodiments of the present disclosure.
Figure 7:
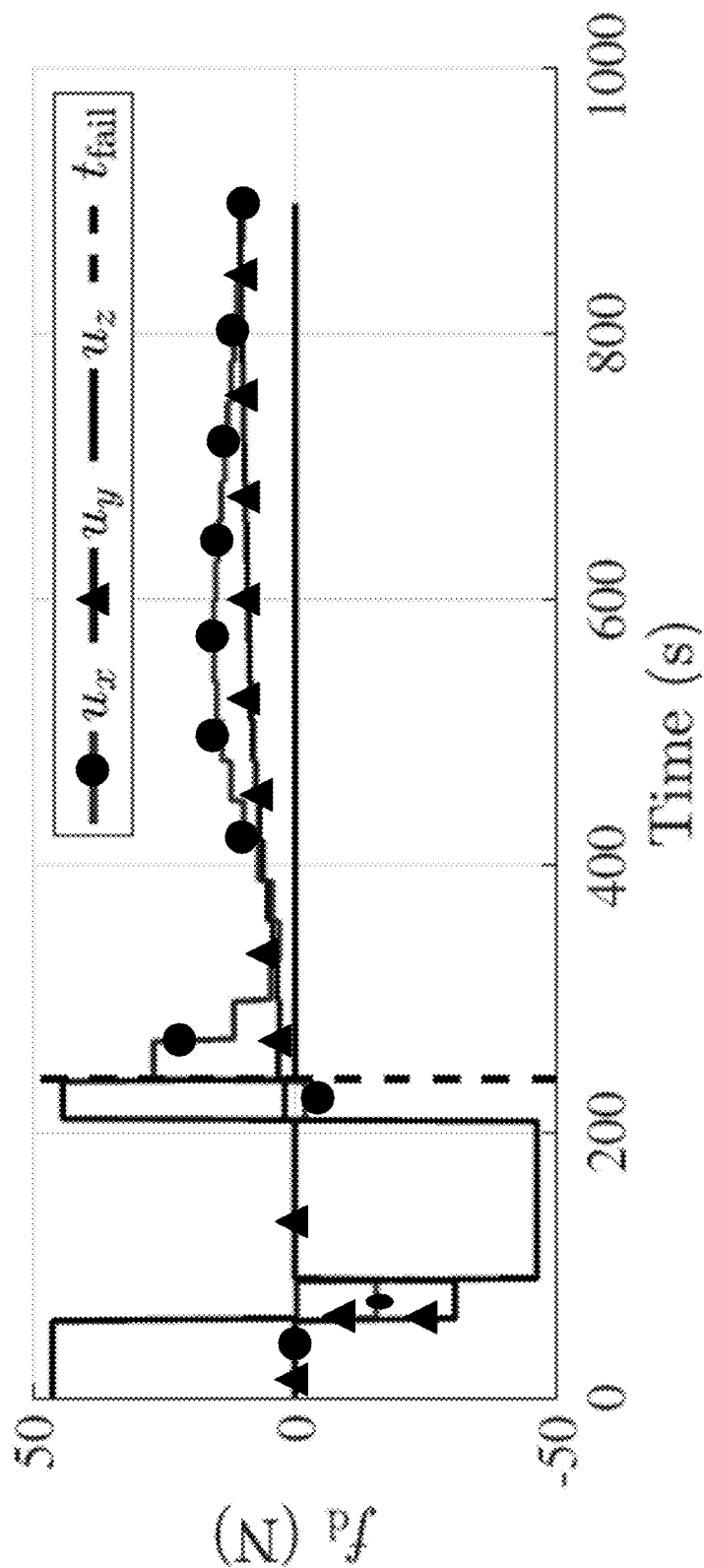
FIG. 7 is a graph illustrating a control history for the safe controller when 1 thruster fails, i.e., $\mathcal{M}_5=\mathcal{I}\backslash\{1\}$, where the vertical dash line marks $t_{fail}$, according to some embodiments of the present disclosure.
Figure 8:
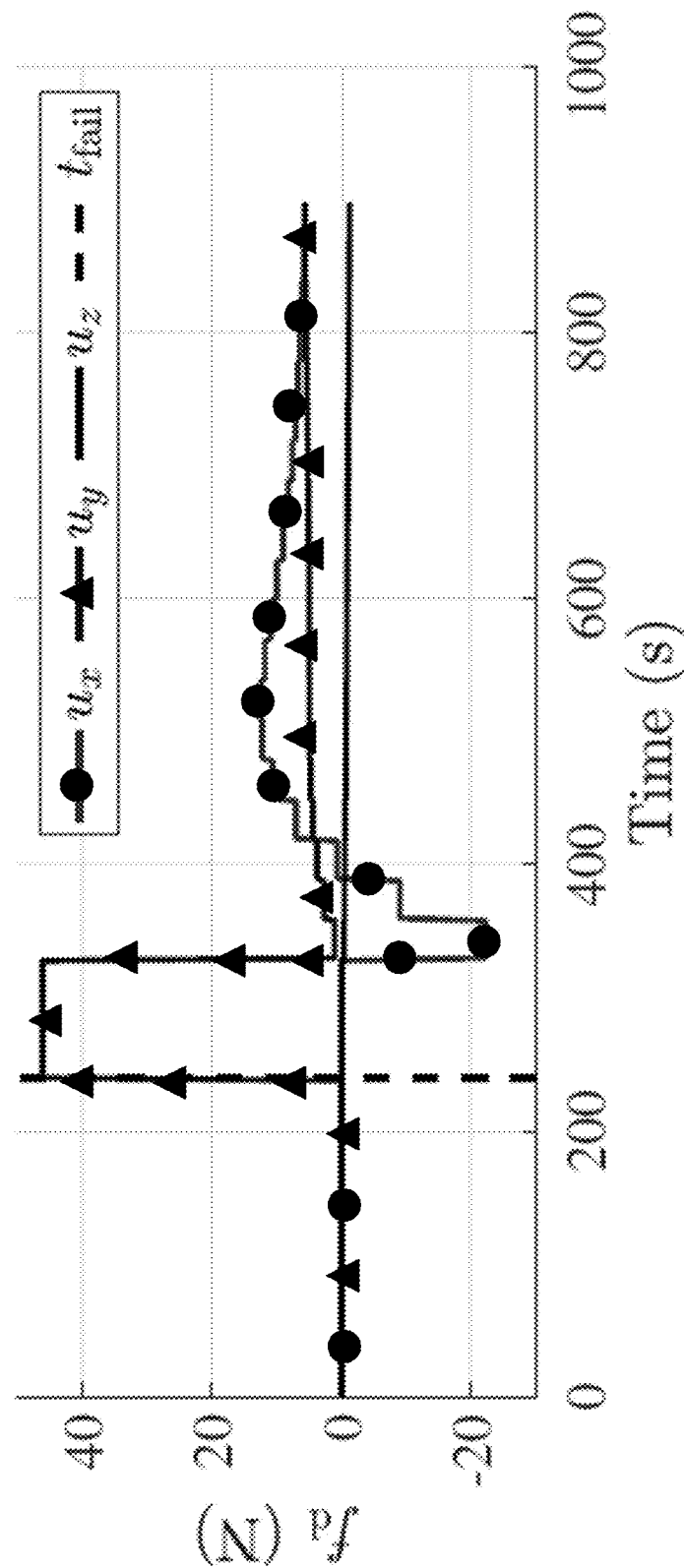
FIG. 8 is a graph illustrating a control history for the unsafe controller when 1 thruster fails, i.e., $\mathcal{M}_5=\mathcal{I}\backslash\{1\}$, where the vertical dash line marks $t_{fail}$, according to some embodiments of the present disclosure.

FIG. 6 is a graph illustrating a position history for the safe and unsafe controllers when 1 thruster fails, i.e., $\mathcal{M}_5$=$\mathcal{I}\setminus\{1\}$, according to some embodiments of the present disclosure. For example, in the case when only thruster 1 has failed is shown in FIG. 6, where $\mathcal{M}_5$=$\mathcal{I}\setminus\{1\}$∈$\mathcal{FM}$, so that, after the failure occurs, $u_t\in\mathcal{U}_5$ for the remainder of the simulation. The initial state in the chief's Hill frame is x($t_0$)=[−0.3178 0.7149 −0.1200 0.0017 −0.0021 0.0004]$^T$ for both controllers. For example, The trajectories for both safe and unsafe controllers are shown in FIG. 6. Once again, while the unsafe controller cannot avoid colliding with the target after entering the $\mathcal{X}_N^{unsafe}$ set, the safe controller is able to by remaining in $\mathcal{X}_N^{safe}$. FIG. 7 and FIG. 8 show control histories for the safe and unsafe controllers. Again, the trade-off between safety and ΔV is clear since Δ$V_{safe}$=6.0639 m/s and Δ$V_{unsafe}$=3.1242 m/s.

FIG. 7 is a graph illustrating a control history for the safe controller when only 1 thruster fails, i.e., $\mathcal{M}_5$=$\mathcal{I}\setminus\{1\}$, where the vertical dash line marks $t_{fail}$, according to some embodiments of the present disclosure.

FIG. 8 is a graph illustrating a control history for the unsafe controller when only 1 thruster fails, i.e., $\mathcal{M}_5$=$\mathcal{I}\setminus\{1\}$, where the vertical dash line marks $t_{fail}$, according to some embodiments of the present disclosure.

Varying Initial Conditions

FIG. 9 is a graph illustrating a simulations with safe controller for multiple safe initial conditions, x($t_0$)∈$\mathcal{X}_N^{safe}$, such that only 1 thruster remains functional after the failure, i.e., $\mathcal{M}_4$={8}, and collisions with the target Scan be avoided, according to some embodiments of the present disclosure. For example, in order to demonstrate that within the orbit-RBRSI safe-abort is impossible, while outside that it is guaranteed, we show simulations of the safe controller for various safe, x($t_0$)∈$\mathcal{X}_N^{safe}$, and unsafe, x($t_0$)∉$\mathcal{X}_N^{safe}$, initial states, where for the unsafe initial conditions, (18c) is softened by slack variables. For simplicity and clarity, we consider a scenario of a planar rendezvous, δz, δż=0. We consider the failure scenario $M_4$, which is challenging since only one thruster remains functional. In these simulations, the failure occurs at $t_0$=$t_{fail}$=0, and as a consequence $u_t\in\mathcal{U}_4$, for all t≥0. We generate random initial conditions in $x_0^{safe,i}$∈$\mathcal{X}_N^{safe}$ and $x_0^{unsafe,i}$∈$\tilde{\mathcal{R}}_N(S_f,\mathcal{U},t_f)\subset\mathcal{X}_N^{unsafe}$. Additionally, the following position and velocity norm constraints are imposed on the samples:

$\|x_p(t_0)\|_2\in[r_1,r_2]$ and $\|x_v(t_0)\|_2\in[v_1,v_2]$, where [$r_1$ $r_2$ $v_1$ $v_2$]= [0.1 km 0.16 km −1.5 ms$^{-1}$ 1.5 ms$^{-1}$].

All of the initial conditions that start in the safe set remain so for the remainder of the simulation as shown in FIG. 9.

Figure 10:
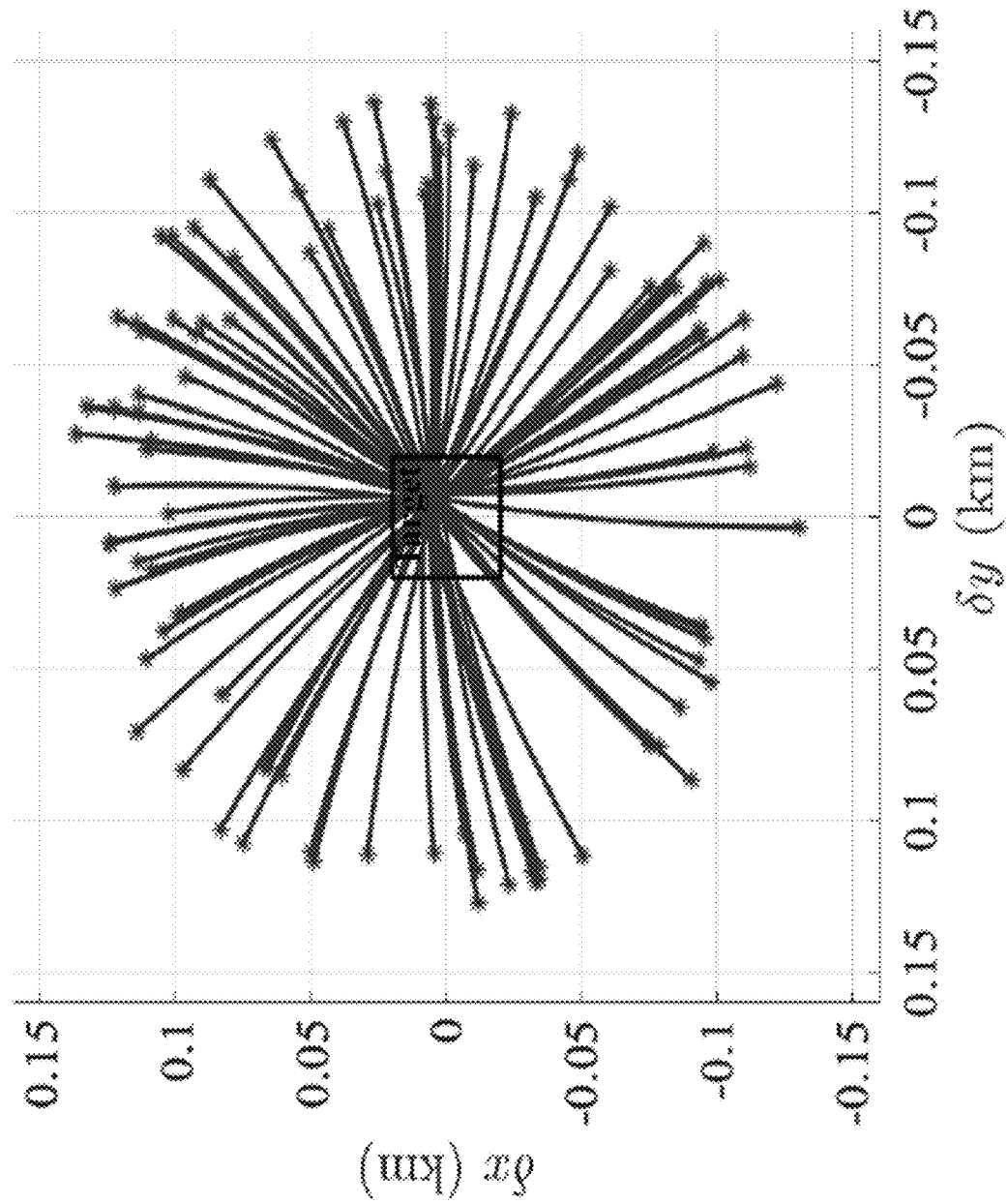
FIG. 10 is a graph illustrating simulations with the safe controller for multiple unsafe initial conditions $x(t_0)\in\mathcal{X}_N^{unsafe}$, where only 1 thruster remains functional after the failure, i.e., $\mathcal{M}_4=\{8\}$, and collisions with the target Sf cannot be avoided, according to some embodiments of the present disclosure.

FIG. 10 is a graph illustrating simulations with the safe controller for multiple unsafe initial conditions x($t_0$)∈$\mathcal{X}_N^{unsafe}$, where only 1 thruster remains functional after the failure, i.e., $\mathcal{M}_4$={8}, and collisions with the target $S_f$ cannot be avoided, according to some embodiments of the present disclosure.

For comparison, FIG. 10 shows the resulting trajectories when the safe controller is used on initial conditions in $\tilde{\mathcal{R}}_N(S_f,\mathcal{U},t_f)$. In this case, the safe controller is incapable of avoiding a collision with the chief, despite safety being enforced, which is true by construction of (11). This highlights the importance of the proposed method, which formally allows the deputy to avoid the chief by remaining in $\tilde{\mathcal{R}}_N(S_f,\mathcal{U},t_f)^c$ at all discrete times. An abort-safe control policy is developed against partial thruster failures for spacecraft rendezvous on generic elliptic orbits using robust backwards reachable sets and model predictive control. The proposed control policy generates rendezvous trajectories such that if a fault occur in the propulsion system, it is always possible to maneuver the deputy spacecraft to avoid colliding with the chief.

Features

According to an embodiment of the present disclosure, a system for controlling an operation of a vehicle in real time to rendezvous the vehicle with a target over a finite time horizon. A transceiver that accepts data in real time including values of vehicle states and target states in a multi-object celestial system, and a predetermined subset of a number of operational thrusters that is less than a total number of operational thrusters of the vehicle, at a specified time period within the finite time horizon. The system including a processor at the specified time period that is to identify a target orbit location from the accepted data in real time. Access a memory having unsafe regions, to select a set of unsafe regions corresponding to the target orbit location and the predetermined subset of the number of operational thrusters of the vehicle. Wherein the set of unsafe regions represents regions of space around the target in which any operation of the predetermined subset of the number of operational thrusters does not avoid collision with the target, guaranteeing collision trajectories with the target. Formulate the set of unsafe regions as safety constraints, and update a controller having a model of dynamics of the vehicle with the accepted data. Generate control commands by subjecting the updated controller to the safety constraints to produce a rendezvous trajectory that avoids the set of unsafe regions, guaranteeing an operation of at least the predetermined subset of the number of operational thrusters, that, in the event of partial vehicle thruster failure, results in a trajectory that does not collide with the target. Output the control commands to activate or not activate one or more thrusters of the vehicle for the specified time period based on the control commands. Wherein one or more of the following aspects below are contemplated as configuring one or more modified embodiments of the above embodiment.

Another aspect is that a guidance and control computer (GCC) of the controller is in communication with the transceiver and the memory, such that the target orbit is determined based on uploaded ephemeris from a ground station, based on ground data obtained in satellite tracking databases, or estimated from onboard sensor measurements on the vehicle obtained from the accepted data. Another aspect is that the target is one of a spacecraft, a celestial body or orbital debris, and a region around the target is one of an approach of an ellipsoid (AE) region or a keep-out sphere (KOS) region. Another aspect is that a region around the target is one of an approach of a polytope (AP) region or a keep-out polytope (KOP) region.

Another aspect is that the set of unsafe regions are a set of unsafe regions determined by computing robust backwards reachable sets of a region around the target, such that the target is a spacecraft, a celestial body or orbital debris, and that the region around the target is one of an over approximation of the physical extent of the target, or an approach ellipsoid (AE) region, or a keep-out ellipsoid region.—Wherein an aspect is that the robust backwards reachable sets are computed backwards-in-time from the target region, as regions of state-space under which any operation of the predetermined subset of the number of operational thrusters does not avoid collision with the target region. Such that an aspect is that the robust backwards reachable sets are polytopes or zonotopes. Another aspect is the computations of the robust backwards reachable sets of the region around the target are performed offline and stored in memory. Still another aspect is the computations of the robust backwards reachable sets of the region around the target are performed online, and in real time based on an estimated position of the target from onboard sensor measurements on the vehicle and stored in memory. It is possible that an aspect is that the target region is time-varying as the target moves along the target orbit such that the robust backwards reachable sets are computed for multiple target positions and target region positions along the target orbit.

Another aspect is the controller is a model predictive controller (MPC) that uses a local convexification of unsafe regions to formulate linear safety constraints that are only satisfied when a vehicle state is not inside the set of unsafe regions. Wherein an aspect is the local convexification of the set of unsafe regions is achieved by computing a half space constraint that approximates an unsafe region boundary. Such that an aspect is the half space constraint is formulated as a chance constraint which requires that the half space constraint be satisfied with at least a priori specified probability level due to an uncertainty regarding a position of the vehicle or the target, and/or an uncertainty of a thruster magnitude or a direction.

Another aspect is the updated controller is subjected to the safety constraints by formulating an optimal control problem that includes the safety constraints so that when optimized over a set of admissible control inputs, an optimizer generates the control commands. Contemplated is an aspect that the control commands are generated as a solution to a model predictive control policy that produces the control commands by optimizing a cost function over a receding horizon. It is possible an aspect is the control commands are generated for each specified time period of multiple specified time periods in the finite time horizon, or generated iteratively over a receding time-horizon, such that at least one iteration includes updating one or combination of the components of the cost function, and weights of the components of the cost function and safety constraints based on a change of a desired operation of the spacecraft. Wherein an aspect is that for each iteration at a next sequential specified time period, there are different sets of unsafe regions. According to another aspect is that the vehicle states and the target states in the multi-object celestial system includes one or combination of positions, orientations, and translational and angular velocities of the vehicle and the target, and perturbations acting on the multi-object celestial system, wherein the vehicle and the target form the multi-object celestial system. An aspect is perturbations acting on the multi-object celestial system are natural orbital forces such as solar and lunar gravitational perturbations, anisotropic gravitational perturbations due to a central body's non-sphericity, solar radiation pressure, air drag.

Another aspect is that the multi-object celestial system includes a celestial reference system or celestial coordinate system, that includes positions of the vehicle such as a spacecraft, the target and other celestial objects in a three-dimensional space, or plot a direction on a celestial sphere, if an object's distance is unknown. Wherein an aspect is that the other celestial objects include a primary body such as Earth around which the target orbits, or a primary body such as Earth and a secondary body such as a Moon, so that the target is in a halo orbit, a periodic three-dimensional orbit near one of a L1 Lagrange point, L2 Lagrange points or L3 Lagrange points. Another aspect is that the target orbit is one of circular orbits, elliptic orbits, halo orbits, near rectilinear halo orbits or quasi-satellite orbit. It is possible an aspect is to access the unsafe regions from the memory, the processor identifies the orbit that the target is located at the specified time period from the accepted data, and accesses an unsafe region (UR) database from the memory in order to select the set of unsafe regions.

Unclaimed Claim set: An aspect is the set of unsafe regions are safety constraints, and to formulate the safety constraints is by using constraint functions that are only satisfied when a vehicle state is not inside the set of unsafe regions. Another aspect is the control commands are generated as a solution to an optimal control problem. Another aspect is the control commands are outputted to an operations module of the controller, such that the operations module communicates the control commands to a thruster command module that receives the control commands as delta v commands, and the thruster command module is to convert the delta v commands to thruster commands, and send the thruster commands to a thruster processor of at least one thruster, to activate or not activate the at least one thruster for trajectory-tracking control of the vehicle, according to the converted delta v commands.

Another aspect further comprising: a cost function associated with the controller including a stabilization component for directing a movement of the vehicle to a target state, a component for an objective of the operation of the spacecraft, and a performance component for optimizing the movement of the vehicle until the target state. Another aspect, further comprising: weighting each of the components of the cost function, such that the optimization of the cost function produces control inputs that achieve goals of each individual component with priority corresponding to their relative weight. An aspect is that the predetermined subset of the number of operational thrusters is provided by a user or an operator.

Boat Independent claim: A controller for controlling an operation of a vehicle in real time to rendezvous the vehicle with a target over a finite time horizon having multiple specified time periods, wherein the vehicle and the target form a multi-object coordination system, and a transceiver accepts data in real time including values of vehicle states and target states in the multi-object coordination system, and a predetermined subset of a number of operational motors that is less than a total number of operational motors of the vehicle, at a specified time period within the finite time horizon, the controller comprising: a guidance and control computer (GCC) processor having an interface to pass information in real time related to a propulsion control system of the vehicle, the GCC processor at the specified time period is configured to identify an area the target is located in real time from the accepted data; access a memory having unsafe regions, to select a set of unsafe regions corresponding to the target area location and the predetermined subset of the number of operational motors of the vehicle, and wherein the set of unsafe regions represents regions within the area around the target in which any operation of the predetermined subset of the number of operational motors does not avoid collision with the target, guaranteeing collision trajectories with the target; formulate the set of unsafe regions as safety constraints, and update a controller having a model of dynamics of the vehicle with the accepted data; generate control commands by subjecting the updated controller to the safety constraints to produce a rendezvous trajectory that avoids the set of unsafe regions, guaranteeing an operation of at least the predetermined subset of the number of operational motors, in the event of partial propulsion control failure results in a trajectory that does not collide with the target; and output the control commands to the propulsion control system to activate or not activate one or more motors of the vehicle for the specified time period based on the control commands.

An aspect is that the multi-object coordination system includes a reference system or coordinate system, that includes positions of the vehicle, the target and other objects in the area, if an object's distance is unknown. Another aspect is wherein the vehicle is a vessel propelled on water, and the perturbations acting on the multi-object coordination system includes one or a combination of an amount of one or more water currents, an amount of one or more winds or amounts of other natural forces, such that the multi-object coordination system is a multi-object nautical coordination system.

Definitions

According to aspects of the present disclosure, and based on experimentation, the following definitions have been established, and certainly are not a complete definition of each phrase or term. Wherein the provided definitions are merely provided as an example, based upon learnings from experimentation, wherein other interpretations, definitions, and other aspects may pertain. However, for at least a mere basic preview of the phrase or term presented, such definitions have been provided.

Space rendezvous: Space rendezvous can be a set of orbital maneuvers during which two spacecraft (or a chaser spacecraft and a target, (i.e. the target can be another spacecraft, space station, celestial body or orbital debris), arrive at the same orbit and approach to a very close distance (e.g. within visual contact).

Celestial System (Celestial Reference System): In astronomy, a celestial coordinate system (or celestial reference system) is a system for specifying positions of satellites, planets, stars, galaxies, and other celestial objects relative to physical reference points available to a situated observer (e.g. the true horizon and north cardinal direction to an observer situated on the Earth's surface). Coordinate systems can specify an object's position in three-dimensional space or plot merely its direction on a celestial sphere, if the object's distance is unknown or trivial. The coordinate systems are implemented in either spherical or rectangular coordinates. Spherical coordinates, projected on the celestial sphere, are analogous to the geographic coordinate system used on the surface of Earth. These differ in their choice of fundamental plane, which divides the celestial sphere into two equal hemispheres along a great circle. Rectangular coordinates, in appropriate units, are simply the cartesian equivalent of the spherical coordinates, with the same fundamental (x, y) plane and primary (x-axis) direction. Each coordinate system is named after its choice of fundamental plane.

FIG. 11A, FIG. 11B, FIG. 11C, FIG. 11D and FIG. 11E are schematic diagrams illustrating of some conventional parameters to better understand aspects used for implementing some aspects of the methods and systems, according to some embodiments of the present disclosure.

Figures 11A, 11B:
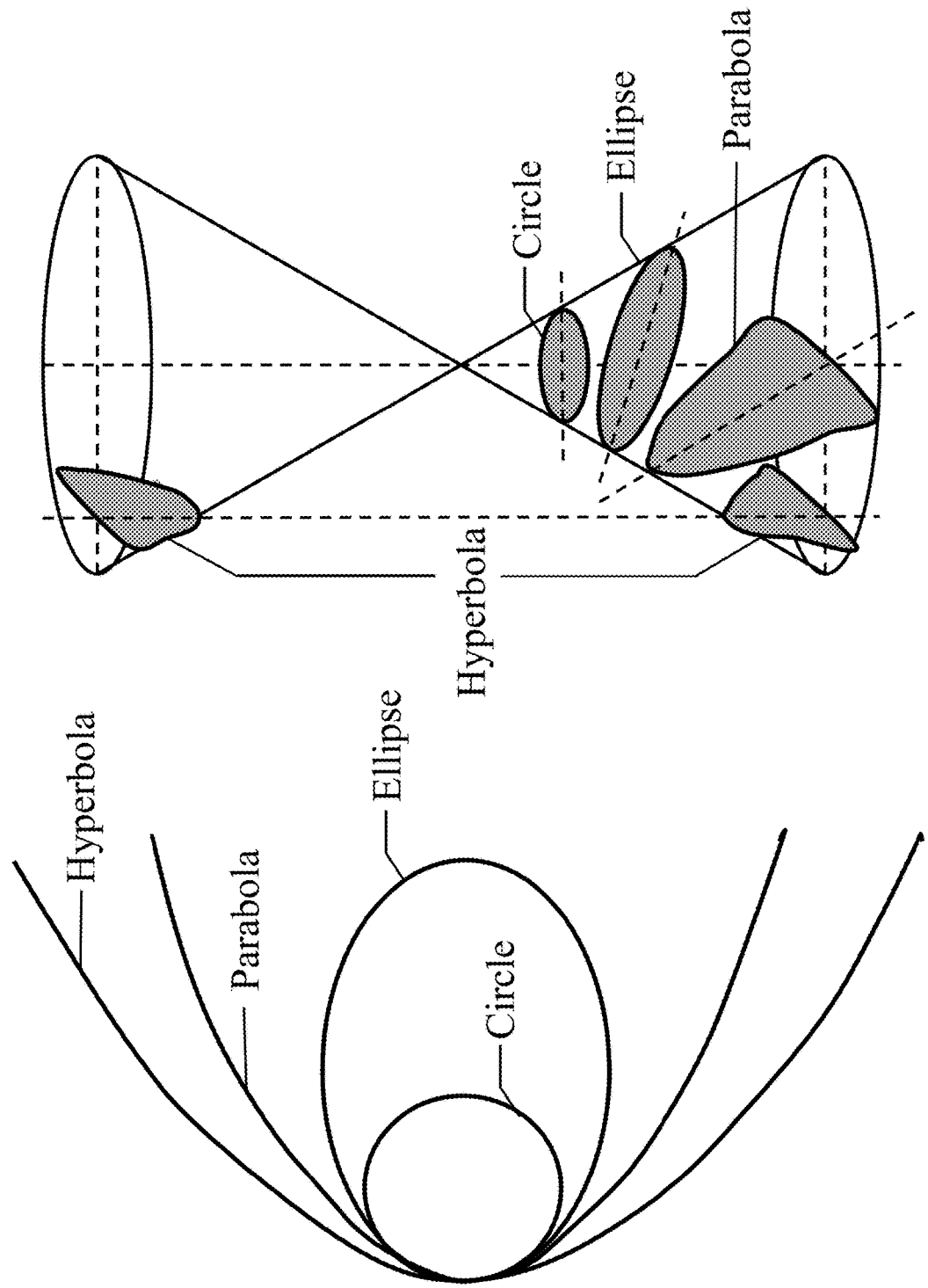
FIG. 11A, FIG. 11B, FIG. 11C, FIG. 11D and FIG. 11E are schematic diagrams of some conventional parameters to better understand aspects used for implementing some aspects of the methods and systems.

Conic Sections: Referring to the FIG. 11A and FIG. 11B, a conic section, or just conic, is a curve formed by passing a plane through a right circular cone. FIG. 11A and FIG. 11B show an angular orientation of a plane relative to the cone that determines whether the conic section is a circle, ellipse, parabola, or hyperbola. The circle and the ellipse arise when the intersection of cone and plane is a bounded curve. The circle is a special case of the ellipse in which the plane is perpendicular to the axis of the cone. If the plane is parallel to a generator line of the cone, the conic is called a parabola. Finally, if the intersection is an unbounded curve and the plane is not parallel to a generator line of the cone, the figure is a hyperbola. In the latter case, the plane will intersect both halves of the cone, producing two separate curves. All conic sections can be defined in terms of the eccentricity. The type of conic section is also related to the semi-major axis and the energy. The table below shows the relationships between eccentricity, semi-major axis, and energy and the type of conic section. For example, conic section for the circle can have an eccentricity, e of 0, a semi-major axis=the radius, and the energy is <0;
conic section for the ellipse can have an eccentricity, e of 0<e<1, a semi-major axis=>0, and the energy is <0;
conic section for the parabola can have an eccentricity, e of 1, a semi-major axis of infinity, and the energy is 0; and
conic section for the hyperbola can have an eccentricity, e of >1, a semi-major axis <0, and the energy is >0.

Satellite orbits can be any of the four conic sections. This page deals mostly with elliptical orbits, though we conclude with an examination of the hyperbolic orbit.

Figure 11D:
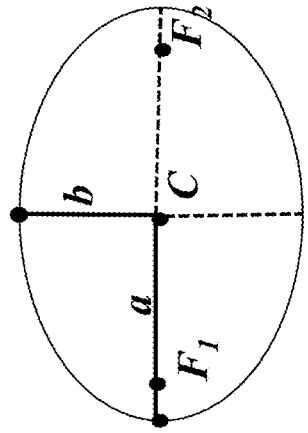
Figure 11C:
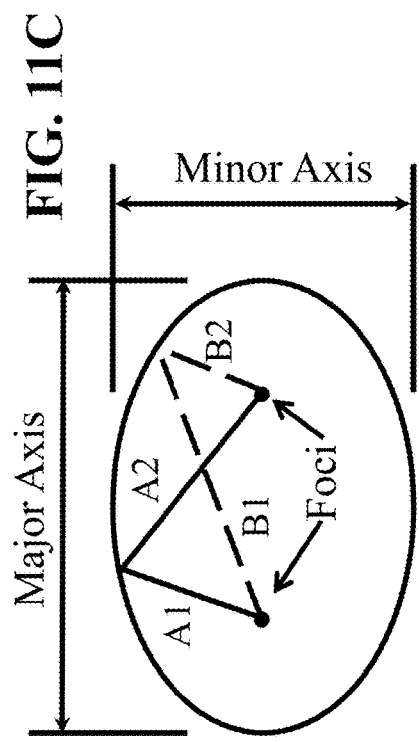
Figure 11E:
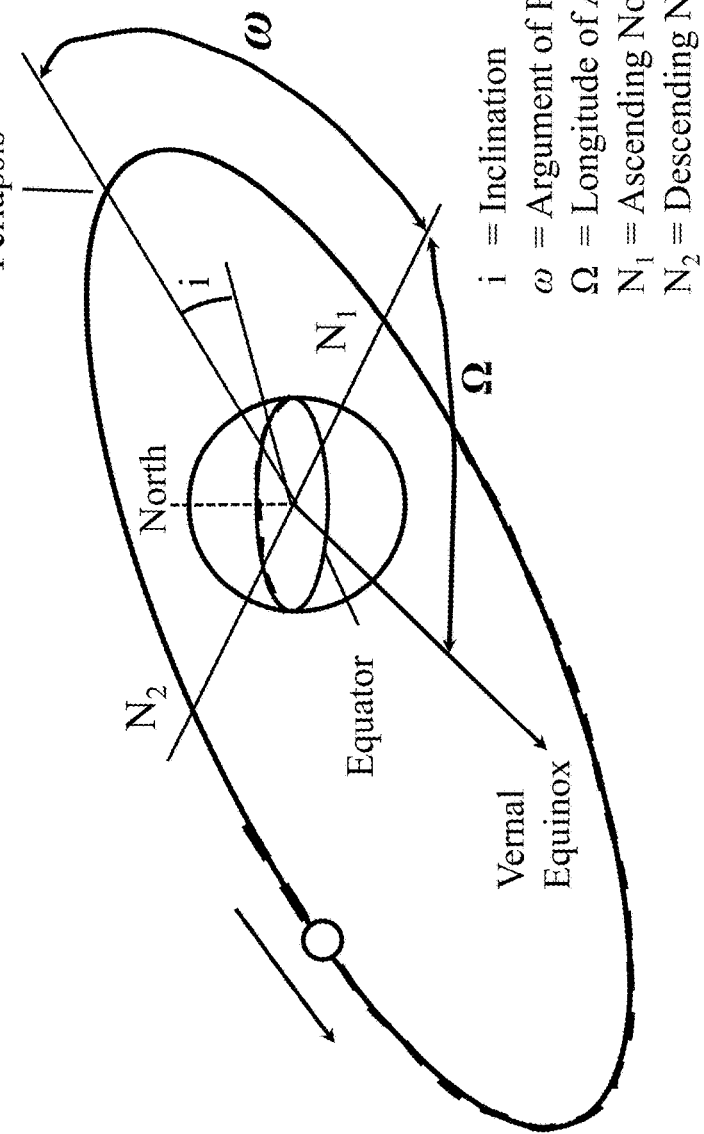

Referring to the FIG. 11C, FIG. 11D and FIG. 11E, to mathematically describe a conventional orbit one must define six quantities, called orbital elements. They are

| Semi-Major Axis, a | Argument of Periapsis, ω |
| Eccentricity, e | Time of Periapsis Passage, T |
| Inclination, I | Longitude of Ascending Node, |

FIG. 11C to FIG. 11E show a conventional orbiting satellite that follows an oval shaped path known as an ellipse with the body being orbited, called the primary, located at one of two points called foci. FIG. 11C shows an ellipse defined to be a curve with the following property: for each point on an ellipse, the sum of its distances from two fixed points, called foci, is constant. The longest and shortest lines that can be drawn through the center of an ellipse are called the major axis and minor axis, respectively. The semi-major axis is one-half of the major axis and represents a satellite's mean distance from its primary. Eccentricity is the distance between the foci divided by the length of the major axis and is a number between zero and one. An eccentricity of zero indicates a circle.

FIG. 11E shows inclination i that is the angular distance between a satellite's orbital plane and the equator of its primary (or the ecliptic plane in the case of heliocentric, or sun centered, orbits). An inclination i of zero degrees indicates an orbit about the primary's equator in the same direction as the primary's rotation, a direction called prograde (or direct). An inclination i of 90 degrees indicates a polar orbit. An inclination i of 180 degrees indicates a retrograde equatorial orbit. A retrograde orbit is one in which a satellite moves in a direction opposite to the rotation of its primary.

Still referring to FIG. 11E, periapsis co is the point in an orbit closest to the primary (i.e. for an object moving in an elliptical orbit about another celestial body, the point of closest approach is the periapsis, and at this point in the orbit, the object is travelling at its greatest speed via Kepler's Second Law). The opposite of periapsis co, the farthest point in an orbit, is called apoapsis (i.e. an object moving in an elliptical orbit about another celestial body, the point of greatest separation is the apoapsis, at this point in the orbit, the object is travelling at its slowest speed via Kepler's Second Law). A perihelion is a position of closest approach, i.e. the shortest distance between the Sun and the planet, at this point in the orbit, the planet is moving at its maximum speed via Kepler's Second Law. An aphelion is a greatest distance between the Sun and the planet, at this point in the orbit, the planet is moving at its slowest speed via Kepler's Second Law, such that the aphelion refers specifically to orbits around the Sun, and is equivalent to the apoapsis of a general orbit. Wherein, the periapsis co and apoapsis are usually modified to apply to the body being orbited, such as perihelion and aphelion for the Sun, perigee and apogee for Earth, perijove and apojove for Jupiter, perilune and apolune for the Moon, etc. The argument of periapsis ω is the angular distance between the ascending node $N_1$ and the point of periapsis (see FIG. 11E). The time of periapsis passage Tis the time in which a satellite moves through its point of periapsis.

Periapsis: The point of a body's elliptical orbit about the system's center of mass where the distance between the body and the center of mass is at its minimum. Wherein, the argument of periapsis (also called argument of perifocus or argument of pericenter), symbolized as co, is one of the orbital elements of an orbiting body. Parametrically, ω is the angle from the body's ascending node to its periapsis, measured in the direction of motion. For specific types of orbits, words including perihelion (for heliocentric orbits), perigee (for geocentric orbits), Periastron (for orbits around stars), and so on may replace the word periapsis. (See apsis for more information.) An argument of periapsis of 0° means that the orbiting body will be at its closest approach to the central body at the same moment that it crosses the plane of reference from South to North. An argument of periapsis of 90° means that the orbiting body will reach periapsis at its north most distance from the plane of reference. Adding the argument of periapsis to the longitude of the ascending node gives the longitude of the periapsis. However, especially in discussions of binary stars and exoplanets, the terms "longitude of periapsis" or "longitude of periastron" are often used synonymously with "argument of periapsis".

Apoapsis: The point of a body's elliptical orbit about the system's centre of mass where the distance between the body and the centre of mass is at its maximum.

Nodes: are the points where an orbit crosses a plane, such as a satellite crossing the Earth's equatorial plane. If the satellite crosses the plane going from south to north, the node is the ascending node $N_1$; if moving from north to south, it is the descending node $N_2$. The longitude of the ascending node $N_1$ is the node's celestial longitude. Celestial longitude is analogous to longitude on Earth and is measured in degrees counter-clockwise from zero with zero longitude being in the direction of the vernal equinox Ω.

Types of orbits: Geosynchronous orbits (GEO): are circular orbits around the Earth having a period of 24 hours. A geosynchronous orbit with an inclination of zero degrees is called a geostationary orbit. A spacecraft in a geostationary orbit appears to hang motionless above one position on the Earth's equator. For this reason, they are ideal for some types of communication and meteorological satellites. A spacecraft in an inclined geosynchronous orbit will appear to follow a regular figure-8 pattern in the sky once every orbit. To attain geosynchronous orbit, a spacecraft is first launched into an elliptical orbit with an apogee of 35,786 km (22,236 miles) called a geosynchronous transfer orbit (GTO). The orbit is then circularized by firing the spacecraft's engine at apogee. Polar orbits (PO): are orbits with an inclination of 90 degrees. Polar orbits are useful for satellites that carry out mapping and/or surveillance operations because as the planet rotates the spacecraft has access to virtually every point on the planet's surface. Walking orbits: An orbiting satellite is subjected to a great many gravitational influences. First, planets are not perfectly spherical and they have slightly uneven mass distribution. These fluctuations have an effect on a spacecraft's trajectory. In addition, the sun, moon, and planets contribute a gravitational influence on an orbiting satellite. With proper planning, it is possible to design an orbit, which takes advantage of these influences to induce a precession in the satellite's orbital plane. The resulting orbit is called a walking orbit. Sun synchronous orbits (SSO): are walking orbits whose orbital plane precesses with the same period as the planet's solar orbit period. In such an orbit, a satellite crosses periapsis at about the same local time every orbit. This is useful if a satellite is carrying instruments, which depend on a certain angle of solar illumination on the planet's surface. In order to maintain an exact synchronous timing, it may be necessary to conduct occasional propulsive maneuvers to adjust the orbit. Molniya orbits: are highly eccentric Earth orbits with periods of approximately 12 hours (2 revolutions per day). The orbital inclination is chosen so the rate of change of perigee is zero, thus both apogee and perigee can be maintained over fixed latitudes. This condition occurs at inclinations of 63.4 degrees and 116.6 degrees. For these orbits, the argument of perigee is typically placed in the southern hemisphere, so the satellite remains above the northern hemisphere near apogee for approximately 11 hours per orbit. This orientation can provide good ground coverage at high northern latitudes. Hohmann transfer orbits: are interplanetary trajectories whose advantage is that they consume the least possible amount of propellant. A Hohmann transfer orbit to an outer planet, such as Mars, is achieved by launching a spacecraft and accelerating it in the direction of Earth's revolution around the sun until it breaks free of the Earth's gravity and reaches a velocity, which places it in a sun orbit with an aphelion equal to the orbit of the outer planet. Upon reaching its destination, the spacecraft must decelerate so that the planet's gravity can capture it into a planetary orbit. For example, to send a spacecraft to an inner planet, such as Venus, the spacecraft is launched and accelerated in the direction opposite of Earth's revolution around the sun (i.e.

decelerated) until it achieves a sun orbit with a perihelion equal to the orbit of the inner planet. It should be noted that the spacecraft continues to move in the same direction as Earth, only more slowly. To reach a planet requires that the spacecraft be inserted into an interplanetary trajectory at the correct time so that the spacecraft arrives at the planet's orbit when the planet will be at the point where the spacecraft will intercept it. This task is comparable to a quarterback "leading" his receiver so that the football and receiver arrive at the same point at the same time. The interval of time in which a spacecraft must be launched in order to complete its mission is called a launch window. Near-rectilinear halo orbits (NRHOs): can be defined as "almost stable" orbits where stability is measured using stability indexes v.

CR3BP model: Near rectilinear halo orbits are members of the broader set of L1 and L2 families of halo orbits, that is, foundational structures that exist in the dynamical environment modeled in terms of multiple gravitational bodies. L1 is a point 1/100 of the way from Earth to the sun, or the first Lagrangian point, where centripetal force and the gravitational pulls of Earth and sun all cancel out. It is one of five such points in the Earth-sun system where a space probe could in principle sit forever as though balanced on the gravitational version of the head of a pin. Another one, L2, is on the far side of Earth from the sun, 1.6 million kilometers out. Both L1 and L2 are ideal venues from which to look out toward the universe, and L1 is a good vantage on Earth and the sun, as well. However, they have drawbacks: At L1, a spacecraft's signal would be overwhelmed by the radiation from the sun behind it. At L2, Earth's shadow blocks the solar radiation a probe needs to power its instruments. The solution is to put spacecraft into "halo orbits" around the Lagrangian points. A spacecraft in a halo orbit around L1 describes huge, lazy loops perpendicular to the Earth-sun axis, endlessly falling toward the balance point. The fundamental behavior also persists in a higher-fidelity model and, thus, supports potential long-term mission scenarios for spacecraft, possibly crewed, in orbits near the Moon. This type of trajectory is first identified in a simplified representation of the gravitational effects in the Earth-Moon system, i.e., the Circular Restricted Three Body Problem (CR3BP). In the CR3BP model, Near-rectilinear halo orbits (NRHOs), i.e. can be defined as "almost stable" orbits where stability is measured using stability indexes v, are characterized by favorable stability properties that suggest the potential to maintain NRHO-like motion over a long duration while consuming few propellant resources. Some NRHOs also possess favorable resonance properties that can be exploited for mission design and are particularly useful to avoid eclipses. For actual mission implementations, however, transfers into such orbits, as well as station keeping strategies, must be demonstrated in a higher-fidelity ephemeris model. Station keeping algorithms for libration point orbits have previously been explored within this dynamical regime in the context of both planar Lyapunov and classical three-dimensional halo orbits. However, NRHOs as constructed in the ephemeris regime.

Perturbation: can be a complex motion of a massive body subject to forces other than the gravitational attraction of a single other massive body. The other forces can include a third (fourth, fifth, etc.) body, resistance, as from an atmosphere, and the off-center attraction of an oblate or otherwise misshapen body. The perturbing forces of the Sun on the Moon at two places in its orbit. The dark dotted arrows represent the direction and magnitude of the gravitational force on the Earth. Applying this to both the Earth's and the Moon's position does not disturb the positions relative to each other. When it is subtracted from the force on the Moon (dark solid arrow), what is left is the perturbing force (dark double arrows) on the Moon relative to the Earth. Because the perturbing force is different in direction and magnitude on opposite sides of the orbit, it produces a change in the shape of the orbit.

Figure 12:
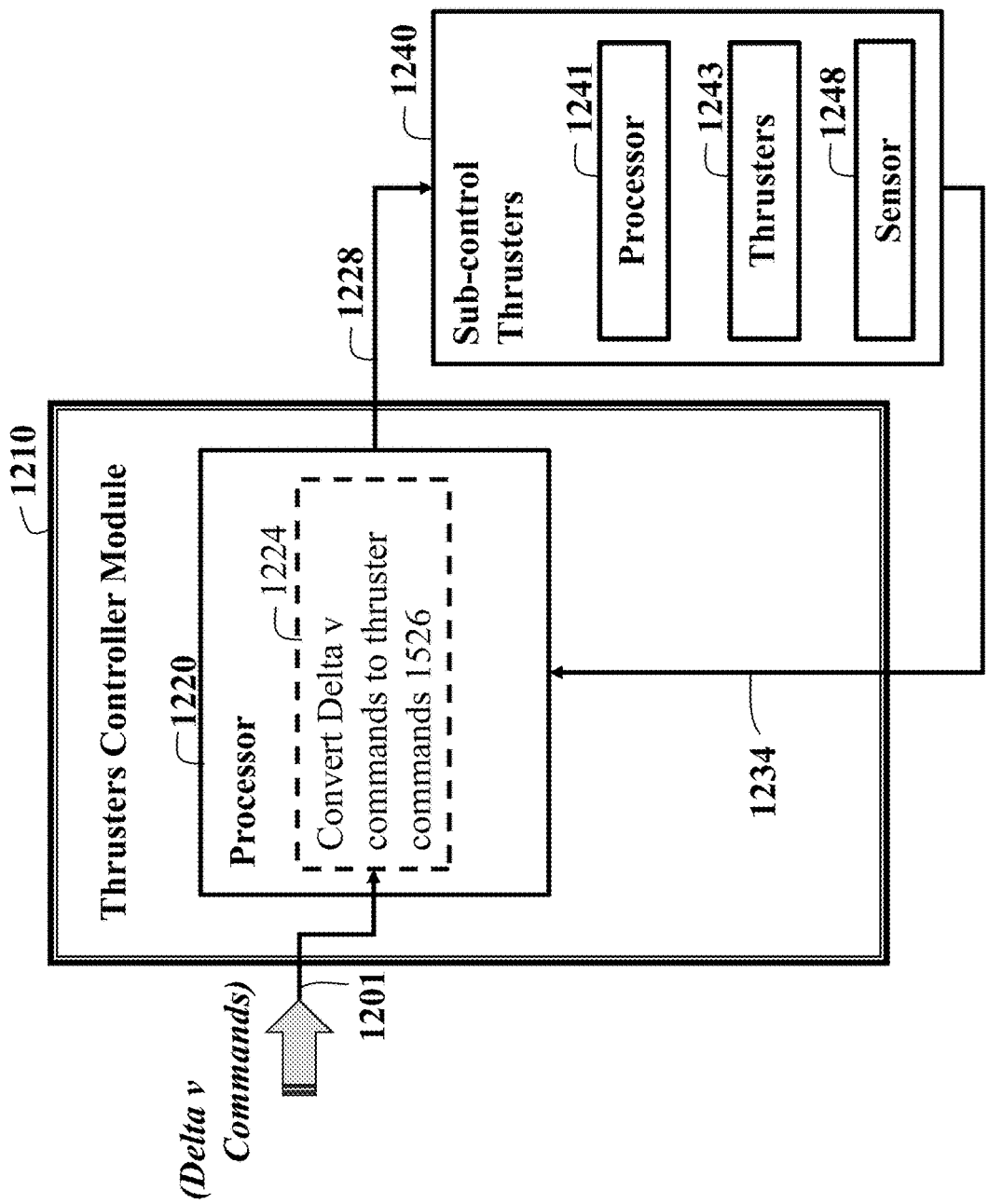
FIG. 12 is a block diagram illustrating some components for implementing the generated transfer orbit, according to an embodiment of the present disclosure.

FIG. 12 is a block diagram illustrating some components for implementing the generated transfer orbit, according to an embodiment of the present disclosure. A thruster controller module 1210 can include a processor 1220 that can convert 1224 the received delta commands 1201 to thruster commands 1226 that can be sent via bus 1228 to the thrusters 1243 of the sub-control thruster 1240, that can be connected to sensors 1248.

Figure 13:
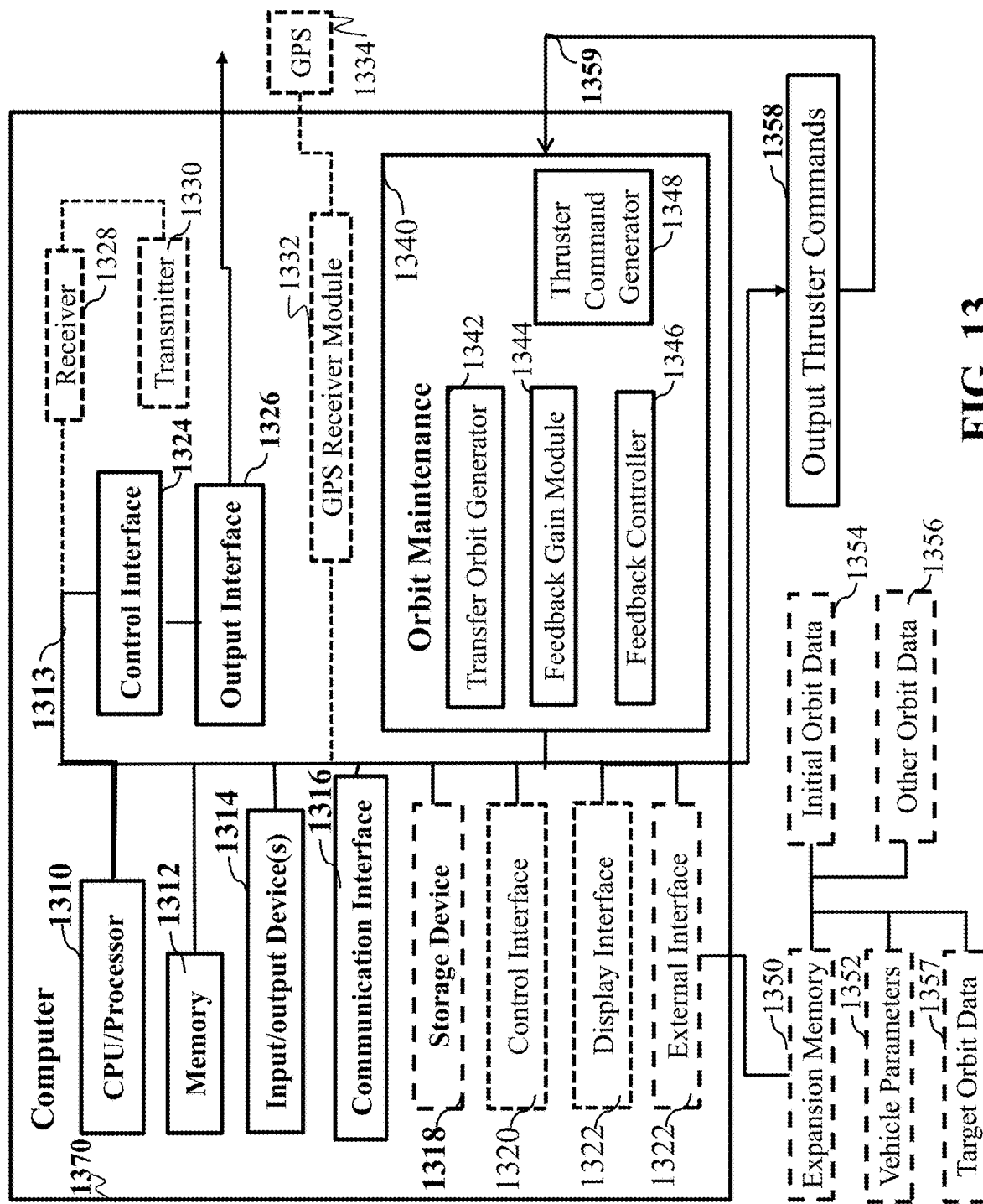
FIG. 13 is a schematic diagram illustrating some components used for implementing the methods and systems, according to some embodiments of the present disclosure.

FIG. 13 is a block diagram illustrating some components that can be used for implementing the systems and methods, according to some embodiments of the present disclosure. For example, a computer system 1370 or network can be adapted for use in determining a transfer orbit for moving a spacecraft or vehicle from an initial orbit about a celestial body (e.g., the Mars or the like) into a target orbit about the celestial body or another celestial body. A CPU or processor(s) 1310 can be connected via a bus system 1313 to a memory 1312, input/output devices 1314 and a communication interface 1316. Also connected to the bus system 1313 can be a storage device 1318, a control interface 1320, display interface 1322, and an external interface 1322. The external interface 1322 can be connected to an expansion memory 1350, vehicle parameters 1352 (i.e. spacecraft specifications, thruster specifications, size, weight, etc.), initial orbit data 1354 (i.e. time, date, parameters including altitude, inclination, eccentricity, etc.) and other orbit data 1356 (i.e. unique orbit data). The bus system 1313 can also connect a control interface 1324, output interface 1326, receiver 1328 and transmitter 1330. Further, the bus system can connect a GPS receiver module 1332 to a GPS 1334. The bus system 1313 can connect an output thruster command module 1358 to output the thruster commands. Wherein bus 1359 connect back to an Orbit Maintenance to communicate data from a thrusters Controller Module (not shown, see FIG. 13).

Still referring to FIG. 13, the computer 1370 can be a server or a desktop, a laptop, a mobile or other computer device or system with one or more processors 1310. The processor 1310 may be a central processing unit adapted for accessing code in the form of a transfer orbit generator 1342 in a memory 1312 or storage data 1318 of the computer 1370 (or in an expansion memory 1350 or other data storage 1352, 1354, 1356. Contemplated are external storage devices if further required depending upon the specific design and aspect of an intended hardware and goal implementation, according aspects related to systems and methods of the present disclosure. For example, the computer 1370 can be used to implement the steps of the systems and methods, where the memory 1312, and/or storage device 1318 can store data.

The stored data in the memory 1312 of FIG. 13 can include the executable modules, vehicle data and historical space data. For example, the vehicle data can include specifications of the spacecraft, dimensions, weight, performance data under varied conditions including gravitation forces, and other perturbations, i.e. complex motion(s) of a massive body subject to forces other than the gravitational attraction of a single other massive body in space. Further, the vehicle data can include data related to aspects related to vehicle dynamics associated with one or more of the multi-variables, i.e. (1) unusual orbital characteristics of a celestial body, i.e. a natural object which is located outside of Earth's atmosphere, such as the Moon, the Sun, an asteroid, planet, or star; (2) unusual orbital motion the celestial body; (3) celestial body's unusually close orbit around another celestial body; and (4) other known perturbations. The space data can include data related to celestial body(s) system, past missions to celestial body(s) and any other data related to space, the spacecraft and planning orbital designs to other celestial bodies in the universe. For example, stored as space data can include data about the moons of celestial body(s), such as characteristics of celestial body(s) that can be taken into consideration in developing orbital designs from an initial celestial body(s) orbit to a similar target celestial body(s) orbit. Optionally, the stored data can be stored in the storage device 1318, the external interface 1322, that is connected an expansion memory 1350 that connects to an initial orbit data database 1354, other orbit data database 1356 and vehicle parameters, specifications, performance, etc. data database 1352, of FIG. 13.

Still referring to FIG. 13, the processor 1310 of the computer 1370 may be two or more processors depending upon the specific application. For example, some steps may require a separate processor to ensure a specific processing time or processing speed associated with the systems and methods of the present disclosure. The receiver 1328 or input interface can receive space data that may be up-to-date space data, obtained from either an Earth Mission Control Center or sensors associated with the spacecraft, or some other location, after the stored historical space data stored in the memory 1312. The receiver 1328 and transmitter 1330 can provide a wireless venue for receiving and sending data to, for example, to an Earth Mission Control Center, or some other destination. A GPS receiver module 1332 connected to a GPS 1334 can be used for navigation related aspects. The computer 1370 can include a control interface 1320, display interface 1322, and optionally external devices, control interfaces, displays, sensors, machines, etc., (not shown, see FIG. 13), that are contemplated for uses related to the systems and methods of the present disclosure.

Figure 14:
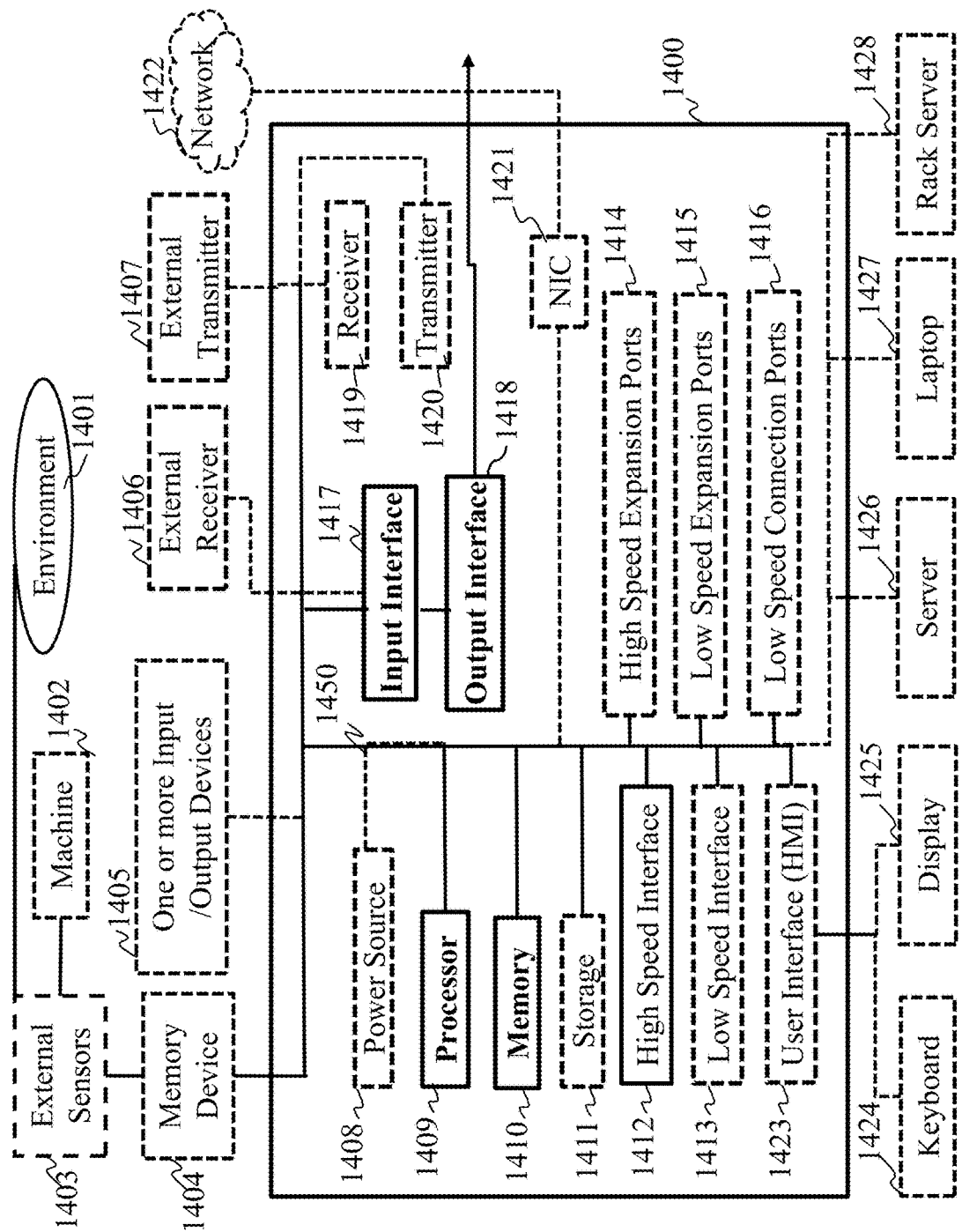
FIG. 14 is a schematic illustrating by non-limiting example a computing apparatus that can be used to implement some techniques of the methods and systems, according to embodiments of the present disclosure.

FIG. 14 is a schematic illustrating by non-limiting example a computing apparatus 1400 that can be used to implement some techniques of the methods and systems, according to embodiments of the present disclosure. The computing apparatus or device 1400 represents various forms of digital computers, such as laptops, desktops, workstations, personal digital assistants, servers, blade servers, mainframes, and other appropriate computers.

The computing device 1400 can include a power source 1408, a processor 1409, a memory 1410, a storage device 1411, all connected to a bus 1450. Further, a high-speed interface 1412, a low-speed interface 1413, high-speed expansion ports 1414 and low speed connection ports 1415, can be connected to the bus 1450. In addition, a low-speed expansion port 1416 is in connection with the bus 1450. Contemplated are various component configurations that may be mounted on a common motherboard, by non-limiting example, 1430, depending upon the specific application. Further still, an input interface 1417 can be connected via bus 1450 to an external receiver 1406 and an output interface 1418. A receiver 1419 can be connected to an external transmitter 1407 and a transmitter 1420 via the bus 1450. Also connected to the bus 1450 can be an external memory 1404, external sensors 1403, machine(s) 1402 and an environment 1401. Further, one or more external input/output devices 1405 can be connected to the bus 1450. A network interface controller (NIC) 1421 can be adapted to connect through the bus 1450 to a network 1422, wherein data or other data, among other things, can be rendered on a third-party display device, third party imaging device, and/or third-party printing device outside of the computer device 1400.

Still referring to FIG. 14, contemplated is that the memory 1410 can store instructions that are executable by the computer device 1400, historical data, and any data that can be utilized by the methods and systems of the present disclosure. The memory 1410 can include random access memory (RAM), read only memory (ROM), flash memory, or any other suitable memory systems. The memory 1410 can be a volatile memory unit or units, and/or a non-volatile memory unit or units. The memory 1410 may also be another form of computer-readable medium, such as a magnetic or optical disk. A storage device 1411 can be adapted to store supplementary data and/or software modules used by the computer device 1400. For example, the storage device 1411 can store historical data and other related data as mentioned above regarding the present disclosure. Additionally, or alternatively, the storage device 1411 can store historical data similar to data as mentioned above regarding the present disclosure. The storage device 1411 can include a hard drive, an optical drive, a thumb-drive, an array of drives, or any combinations thereof. Further, the storage device 1411 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1409), perform one or more methods, such as those described above.

Still referring to FIG. 14, the system can be linked through the bus 1450 optionally to a display interface or user Interface (HMI) 1423 adapted to connect the system to a display device 1425 and keyboard 1424, wherein the display device 1425 can include a computer monitor, camera, television, projector, or mobile device, among others. The computer device 1400 can include a user input interface 1417 adapted to a printer interface (not shown) can also be connected through bus 1450 and adapted to connect to a printing device (not shown), wherein the printing device can include a liquid inkjet printer, solid ink printer, large-scale commercial printer, thermal printer, UV printer, or dye-sublimation printer, among others.

Still referring to FIG. 14, the high-speed interface 1412 manages bandwidth-intensive operations for the computing device 1400, while the low-speed interface 1413 manages lower bandwidth-intensive operations. Such allocation of functions is an example only. In some implementations, the high-speed interface 1412 can be coupled to the memory 1410, a user interface (HMI) 1423, and to a keyboard 1424 and display 1425 (e.g., through a graphics processor or accelerator), and to the high-speed expansion ports 1414, which may accept various expansion cards (not shown) via bus 1450. In the implementation, the low-speed interface 1413 is coupled to the storage device 1411 and the low-speed expansion port 1415, via bus 1450. The low-speed expansion port 1415, which may include various communication ports (e.g., USB, Bluetooth, Ethernet, wireless Ethernet) may be coupled to one or more input/output devices 1405, and other devices a keyboard 1424, a pointing device (not shown), a scanner (not shown), or a networking device such as a switch or router, e.g., through a network adapter. The computing device 1400 may be implemented in a number of different forms, as shown in the figure. For example, it may be implemented as a standard server 1426, or multiple times in a group of such servers. In addition, it may be implemented in a personal computer such as a laptop computer 1427. It may also be implemented as part of a rack server system 1428. Alternatively, components from the computing device 1400 may be combined with other components in a mobile device (not shown). Each of such devices may contain one or more of the computing device and the mobile computing device, and an entire system may be made up of multiple computing devices communicating with each other.

Figure 15:
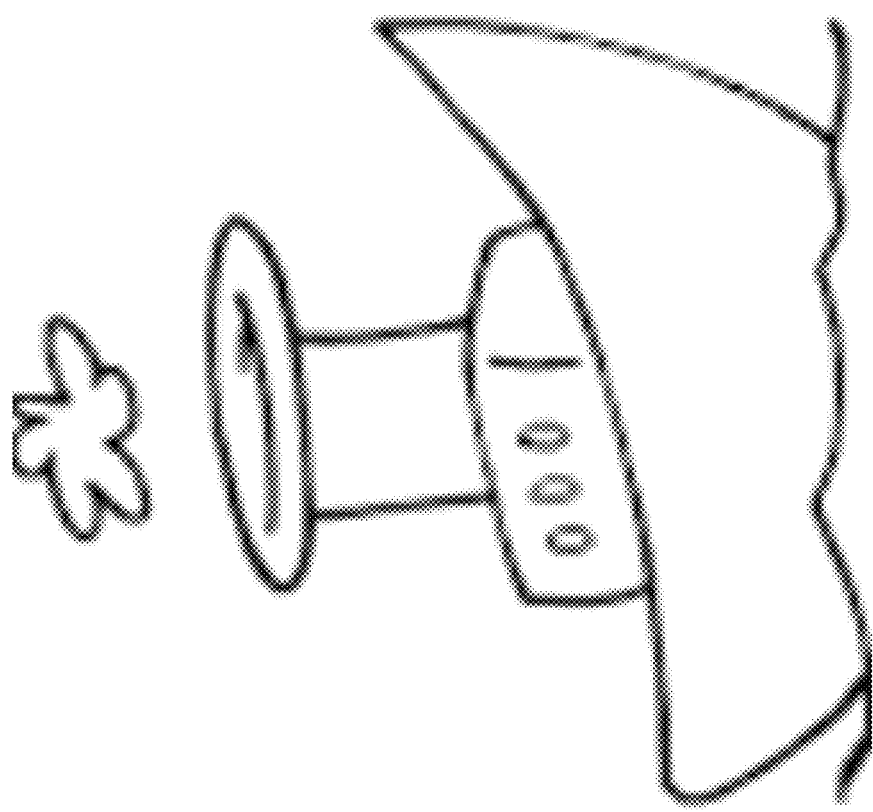
FIG. 15 is a schematic diagram illustrating a motor boat, according to an embodiment of the present disclosure.

FIG. 15 is a schematic diagram illustrating a motor boat, according to an embodiment of the present disclosure. A controller for controlling an operation of a boat in real time to rendezvous the boat with a target over a finite time horizon having multiple specified time periods, wherein the boat and the target form a multi-object coordination system, and a transceiver accepts data in real time including values of boat states and target states in the multi-object coordination system, and a predetermined subset of a number of operational motors that is less than a total number of operational motors of the boat, at a specified time period within the finite time horizon, the controller comprising: a guidance and control computer (GCC) processor having an interface to pass information in real time related to a propulsion control system of the boat, the GCC processor at the specified time period is configured to identify an area the target is located in real time from the accepted data; access a memory having unsafe regions, to select a set of unsafe regions corresponding to the target area location and the predetermined subset of the number of operational motors of the boat, and wherein the set of unsafe regions represents regions within the area around the target in which any operation of the predetermined subset of the number of operational motors does not avoid collision with the target, guaranteeing collision trajectories with the target; formulate the set of unsafe regions as safety constraints, and update a controller having a model of dynamics of the boat with the accepted data; generate control commands by subjecting the updated controller to the safety constraints to produce a rendezvous trajectory that avoids the set of unsafe regions, guaranteeing an operation of at least the predetermined subset of the number of operational motors, in the event of partial propulsion control failure results in a trajectory that does not collide with the target; and output the control commands to the propulsion control system to activate or not activate one or more motors of the boat for the specified time period based on the control commands.

Embodiments

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments. Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Although the present disclosure has been described with reference to certain preferred embodiments, it is to be understood that various other adaptations and modifications can be made within the spirit and scope of the present disclosure.

What is claimed is:

1. A system for controlling an operation of a vehicle in real time to rendezvous the vehicle with a target over a finite time horizon, the system in communication with a transceiver that accepts data in real time including values of vehicle states and target states in a multi object celestial system, and a predetermined subset of a number of operational thrusters that is less than a total number of operational thrusters of the vehicle, at a specified time period within the finite time horizon, comprising:
   a memory having unsafe regions, the memory configured to store executable instructions; and
   a processor configured to execute the executable instructions, at the specified time period to:
      identify a target orbit location from the accepted data in real time, access the memory having unsafe regions, to select a set of unsafe regions corresponding to the target orbit location and the predetermined subset of the number of operational thrusters of the vehicle, and wherein the set of unsafe regions represents regions of space around the target in which any operation of the predetermined subset of the number of operational thrusters does not avoid collision with the target, guaranteeing collision trajectories with the target, wherein the set of unsafe regions are determined by computing robust backwards reachable sets of a region around the target;
      formulate the set of unsafe regions as safety constraints, and update a controller having a model of dynamics of the vehicle with the accepted data;
      generate control commands by subjecting the updated controller to the safety constraints to produce a rendezvous trajectory that avoids the set of unsafe regions, guaranteeing an operation of at least the predetermined subset of the number of operational thrusters, that, in the event of partial vehicle thruster failure, results in a trajectory that does not collide with the target; and
      output the control commands to activate or not activate one or more thrusters of the vehicle for the specified time period based on the control commands.

2. The system of claim 1, wherein a guidance and control computer (GCC) of the controller is in communication with the transceiver and the memory, such that the target orbit is determined based on uploaded ephemeris from a ground station, based on ground data obtained in satellite tracking databases, or estimated from onboard sensor measurements on the vehicle obtained from the accepted data.

3. The system of claim 1, wherein the target is one of a spacecraft, a celestial body or orbital debris, and a region around the target is one of an approach of an ellipsoid (AE) region or a keep-out sphere (KOS) region or an over-approximation of the target's physical geometry.

4. The system of claim 1, wherein a region around the target is one of an approach of a polytope (AP) region or a keep-out polytope (KOP) region or an over-approximation of a target's physical geometry.

5. The system of claim 1, wherein the target is a spacecraft, a celestial body or orbital debris, and the region around the target is one of an over approximation of a physical geometry of the target, or an approach ellipsoid (AE) region, or a keep-out ellipsoid region.

6. The system of claim 1, wherein the robust backwards reachable sets are computed backwards-in-time from the region around the target, as regions of state-space under which any operation of the predetermined subset of the number of operational thrusters does not avoid collision with the target region.

7. The system of claim 1, wherein the robust backwards reachable sets are polytopes or zonotopes.

8. The system of claim 1, wherein the computations of the robust backwards reachable sets of the region around the target are performed offline and stored in memory.

9. The system of claim 1, wherein the computations of the robust backwards reachable sets of the region around the target are performed online, and in real time based on an estimated position of the target from onboard sensor measurements on the vehicle and stored in memory.

10. The system of claim 1, wherein the region around the target is time-varying as the target moves along the target orbit such that the robust backwards reachable sets are computed for multiple target positions and target region positions along the target orbit.

11. The system of claim 1, wherein the controller is a model predictive controller (MPC) that uses a local convexification of unsafe regions to formulate linear safety constraints that are only satisfied when a vehicle state is not inside the set of unsafe regions.

12. The system of claim 11, wherein the local convexification of the set of unsafe regions is achieved by computing a half space constraint that approximates an unsafe region boundary, such that the computing of the half-space covers a local region of unsafe sets that represents a safety constraint for an online trajectory generation process, whereby enforcing one or more half-space constraints provides safety so that the vehicle state remains in a safe set of safe regions and outside an unsafe set of unsafe regions.

13. The system of claim 12, wherein the half space constraint is formulated as a chance constraint which requires that the half space constraint be satisfied with at least a priori specified probability level due to an uncertainty regarding a position of the vehicle or the target, and/or an uncertainty of a thruster magnitude or a direction.

14. The system of claim 1, wherein the updated controller is subjected to the safety constraints by formulating an optimal control problem that includes the safety constraints so that when optimized over a set of admissible control inputs, an optimizer generates the control commands.

15. The system of claim 1, wherein the control commands are generated as a solution to a model predictive control policy that produces the control commands by optimizing a cost function over a receding horizon.

16. The system of claim 1, wherein the control commands are generated for each specified time period of multiple specified time periods in the finite time horizon, or generated iteratively over a receding time-horizon, such that at least one iteration includes updating one or combination of the components of the cost function, and weights of the components of the cost function and safety constraints based on a change of a desired operation of the spacecraft.

17. The system of claim 16, wherein for each iteration at a next sequential specified time period, there are different sets of unsafe regions.

18. The system of claim 1, wherein the vehicle states and the target states in the multi-object celestial system includes one or combination of positions, orientations, and translational and angular velocities of the vehicle and the target, and perturbations acting on the multi-object celestial system, wherein the vehicle and the target form the multi-object celestial system.

19. The system of claim 18, wherein the perturbations acting on the multi-object celestial system are natural orbital forces such as solar and lunar gravitational perturbations, anisotropic gravitational perturbations due to a central body's non sphericity, solar radiation pressure, and air drag.

20. The system of claim 19, wherein the other celestial objects include a primary body such as Earth around which the target orbits, or a primary body such as Earth and a secondary body such as a Moon, so that the target is in a halo orbit, a periodic three-dimensional orbit near one of a L1 Lagrange point, L2 Lagrange points or L3 Lagrange points.

21. The system of claim 1, wherein the multi-object celestial system includes a celestial reference system or celestial coordinate system, that includes positions of the vehicle such as a spacecraft, the target and other celestial objects in a three dimensional space, or plot a direction on a celestial sphere, if an object's distance is unknown.

22. The system of claim 1, wherein the target orbit is one of circular orbits, elliptic orbits, halo orbits, near rectilinear halo orbits or quasi-satellite orbit.

23. The system of claim 1, wherein to access the unsafe regions from the memory, the processor identifies the orbit that the target is located at the specified time period from the accepted data, and accesses an unsafe region (UR) database from the memory in order to select the set of unsafe regions.

24. A controller for controlling an operation of a vehicle in real time to rendezvous the vehicle with a target over a finite time horizon, the controller in communication with a transceiver that accepts data in real time including a target orbit location, and a predetermined subset of a number of operational thrusters that is less than a total number of operational thrusters of the vehicle, comprising:
  a guidance and control computer (GCC) processor in a specified time period within the finite time horizon is to access a memory having unsafe regions, and select a set of unsafe regions corresponding to the target orbit location and the predetermined subset of the number of operational thrusters of the vehicle, and wherein the set of unsafe regions represents regions of space around the target in which any operation of the predetermined subset of the number of operational thrusters does not avoid collision with the target, guaranteeing collision trajectories with the target, wherein the set of unsafe regions are determined by computing robust backwards reachable sets of a region around the target;
  formulate the set of unsafe regions as safety constraints, and update a control module having a model of dynamics of the vehicle with the accepted data;
  generate control commands by subjecting the updated control module to the safety constraints to produce a rendezvous trajectory that avoids the set of unsafe regions, guaranteeing an operation of at least the predetermined subset of the number of operational thrusters, in the event of partial vehicle thruster failure results in a trajectory that does not collide with the target; and
  output the control commands to activate or not activate one or more thrusters of the vehicle based on the control commands.

25. The controller of claim 24, wherein the accepted real time data includes values of vehicle states and target states in a multi-object celestial system, at the specified time period of multiple time periods within the finite time horizon, such that accepted data is used to update the controller.

26. The controller of claim 24, wherein the accepted data includes, one or a subset of, vehicle data obtained from vehicle sensors associated with the vehicle at the specified time period, vehicle data obtained from sensors not located on the vehicle at the specified time period or data including mission data, space data and vehicle data obtained from vehicle sensors and non-vehicle sensors at the specified time period.

27. A method for controlling an operation of a vehicle in real time to rendezvous the vehicle with a target over a finite time horizon having multiple specified time periods, and accepting data in real time including values of vehicle states and target states in a multi-object celestial system, and a predetermined subset of a number of operational thrusters that is less than a total number of operational thrusters of the vehicle, at a specified time period within the finite time horizon, comprising:
  identifying a target orbit location from the accepted data in real time;
  accessing a memory having unsafe regions, to select a set of unsafe regions corresponding to the target orbit location and the predetermined subset of the number of operational thrusters of the vehicle within the specified time period, and
  wherein the set of unsafe regions represents regions of space around the target in which any operation of the predetermined subset of the number of operational thrusters does not avoid collision with the target, guaranteeing collision trajectories with the target, wherein the set of unsafe regions are determined by computing robust backwards reachable sets of a region around the target;
  formulating the set of unsafe regions as safety constraints, and updating a controller having a model of dynamics of the vehicle with the accepted data;
  generating control commands by subjecting the updated controller to the safety constraints to produce a rendezvous trajectory that avoids the set of unsafe regions, guaranteeing an operation of at least the predetermined subset of the number of operational thrusters, in the event of partial vehicle thruster failure results in a trajectory that does not collide with the target; and
  outputting the control commands to activate or not activate one or more thrusters of the vehicle for the specified time period based on the control commands.

28. A non-transitory machine-readable medium including instructions stored thereon which, when executed by processing circuitry, configure the processing circuitry in real time to perform operations to control a spacecraft to rendezvous the spacecraft with a target over a finite time horizon, such that the spacecraft and the target form a multi-object celestial system, and accepting data in real time including values of spacecraft states and target states in a multi-object celestial system, and a predetermined subset of a number of operational thrusters that is less than a total number of operational thrusters of the spacecraft, at a specified time period within the finite time horizon, comprising:
  identifying a target orbit location from the accepted data in real time;
  accessing a memory having unsafe regions, to select a set of unsafe regions corresponding to the target orbit location and the predetermined subset of the number of operational thrusters of the spacecraft within the specified time period, and wherein the set of unsafe regions represents regions of space around the target in which any operation of the predetermined subset of the number of operational thrusters does not avoid collision with the target, guaranteeing collision trajectories with the target, wherein the set of unsafe regions are determined by computing robust backwards reachable sets of a region around the target;

formulating the set of unsafe regions as safety constraints, and updating a controller having a model of dynamics of the spacecraft with the accepted data;

generating control commands by subjecting the updated controller to the safety constraints to produce a rendezvous trajectory that avoids the set of unsafe regions, guaranteeing an operation of at least the predetermined subset of the number of operational thrusters, in the event of partial spacecraft thruster failure results in a trajectory that does not collide with the target; and outputting the control commands to activate or not activate one or more thrusters of the spacecraft for the specified time period based on the control commands.

* * * * *